United States Patent
Mori et al.

(10) Patent No.: US 7,418,404 B2
(45) Date of Patent: Aug. 26, 2008

(54) COMMODITY ORDER ACCEPTANCE AND TRANSPORTATION SYSTEM, METHOD, AND RECORDING MEDIUM

(75) Inventors: Hideyuki Mori, Tokyo (JP); Kiyokazu Nakamura, Chiba-ken (JP); Kenji Itoh, Tokyo (JP)

(73) Assignee: Ricoh Company, Ltd., Yokohama-shi (JP)

( * ) Notice: Subject to any disclaimer, the term of this patent is extended or adjusted under 35 U.S.C. 154(b) by 691 days.

(21) Appl. No.: 10/324,098

(22) Filed: Dec. 20, 2002

(65) Prior Publication Data
US 2003/0163385 A1 Aug. 28, 2003

(30) Foreign Application Priority Data
Dec. 20, 2001 (JP) ............................. 2001-387776
Dec. 20, 2001 (JP) ............................. 2001-387798

(51) Int. Cl.
*G06Q 30/00* (2006.01)
*G06Q 17/31* (2006.01)
(52) U.S. Cl. ......................................................... 705/26
(58) Field of Classification Search .............. 705/26–27
See application file for complete search history.

(56) References Cited

U.S. PATENT DOCUMENTS

| | | | |
|---|---|---|---|
| 6,606,744 B1* | 8/2003 | Mikurak | 717/174 |
| 2002/0072994 A1* | 6/2002 | Mori et al. | 705/26 |
| 2002/0147656 A1* | 10/2002 | Tam et al. | 705/26 |
| 2004/0117261 A1* | 6/2004 | Walker et al. | 705/14 |

FOREIGN PATENT DOCUMENTS

JP 2002-175453 A 6/2002

OTHER PUBLICATIONS

Mont, Oksana, "Product-Service Systems", The International Institute of Industrial Environmental Economics, Lundy University, 2000.*

* cited by examiner

*Primary Examiner*—Jeffrey A. Smith
*Assistant Examiner*—Kalyan Deshpande
(74) *Attorney, Agent, or Firm*—Morrison & Foerster LLP

(57) ABSTRACT

An administrator of a system 10 sells an own company's or another company's commodity to a user via a facsimile, telephone, and electronic mail in order to deal with another company's commodity and support and correspond to diversifying customer purchase needs without suffering from inventory. A user information storage device 14 is provided so as to store an amount of payment for a commodity and support, which is determined by a user and dealer, together with user information. A buying-in information storage device 15 is provided so as to store a buying-in price of the commodity and support from a provider thereof. A reception device 11 is provided so as to receive purchase request information from a user 1. A reception processing device 13 is provided so as to consolidate the purchase request information and perform an order acceptance process in accordance with the purchase request information. A commodity transportation instruction device 16 refers to various information stored in the user and buying-in information storage devices 14 and 15 in accordance with the order acceptance process, and instruct the provider to either transport the commodity or provide the support. The provider acts on the instruction by executing transportation or provision to the user 1. The administrator manages and sells an own company's commodity.

8 Claims, 42 Drawing Sheets

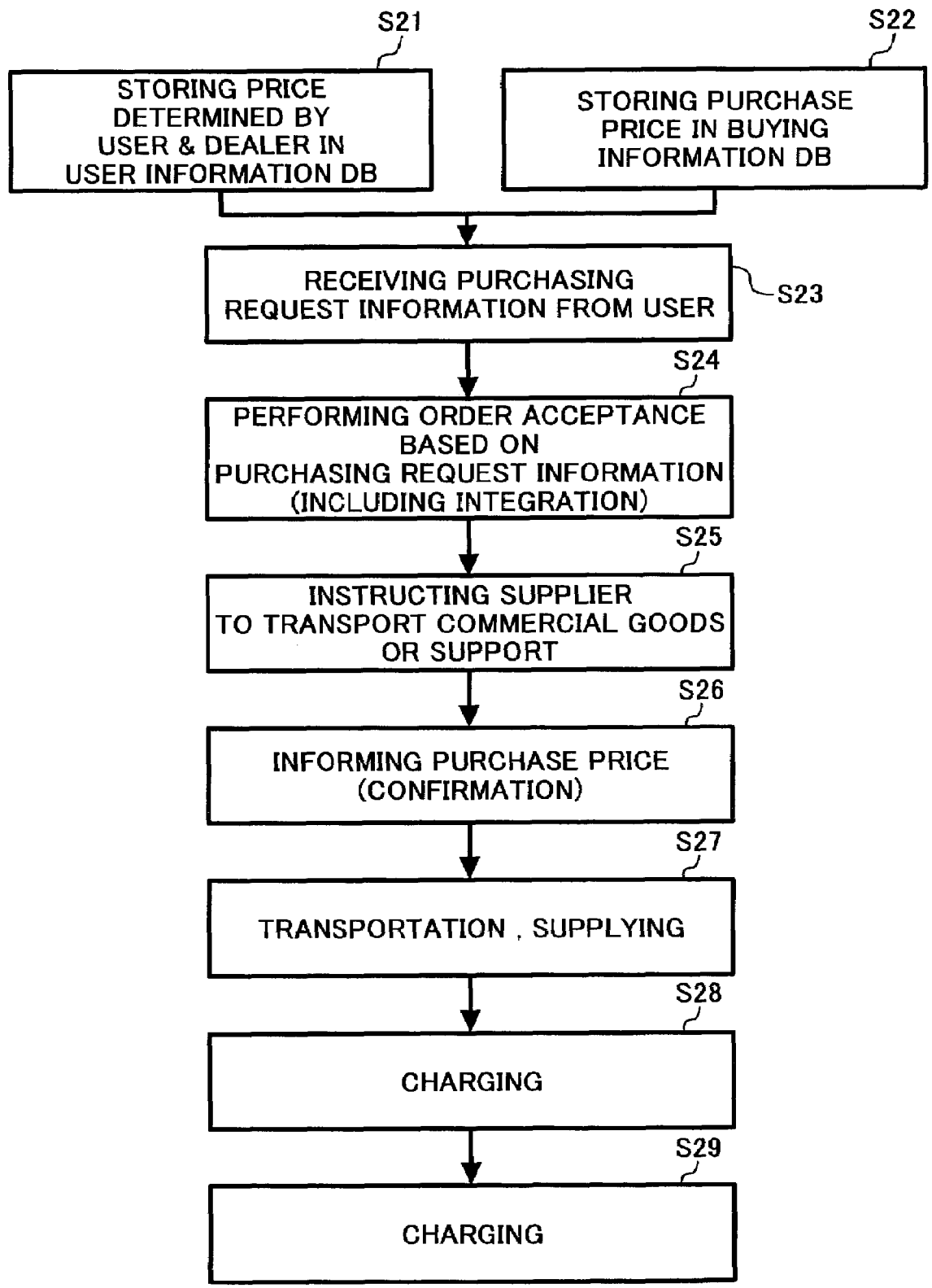

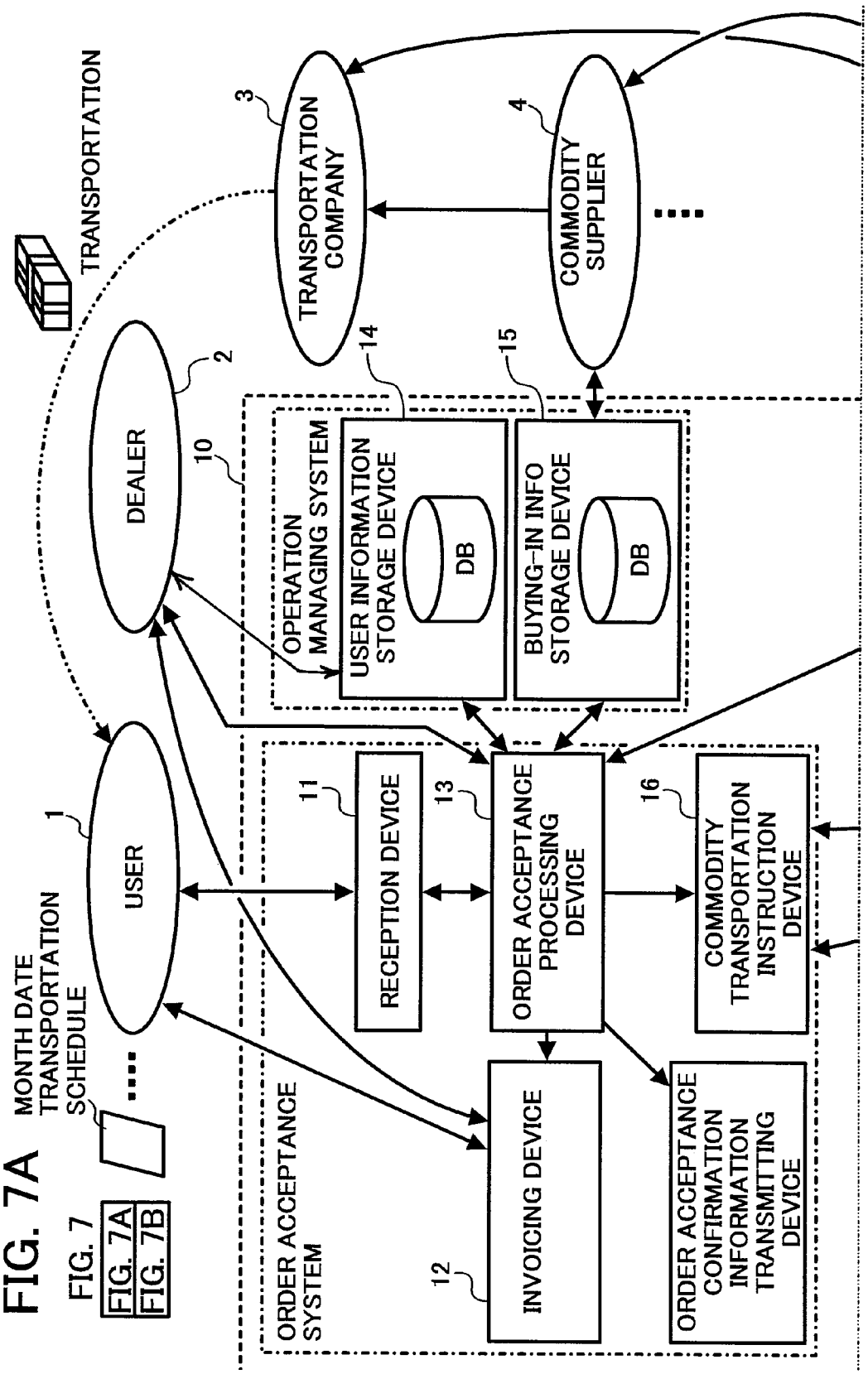

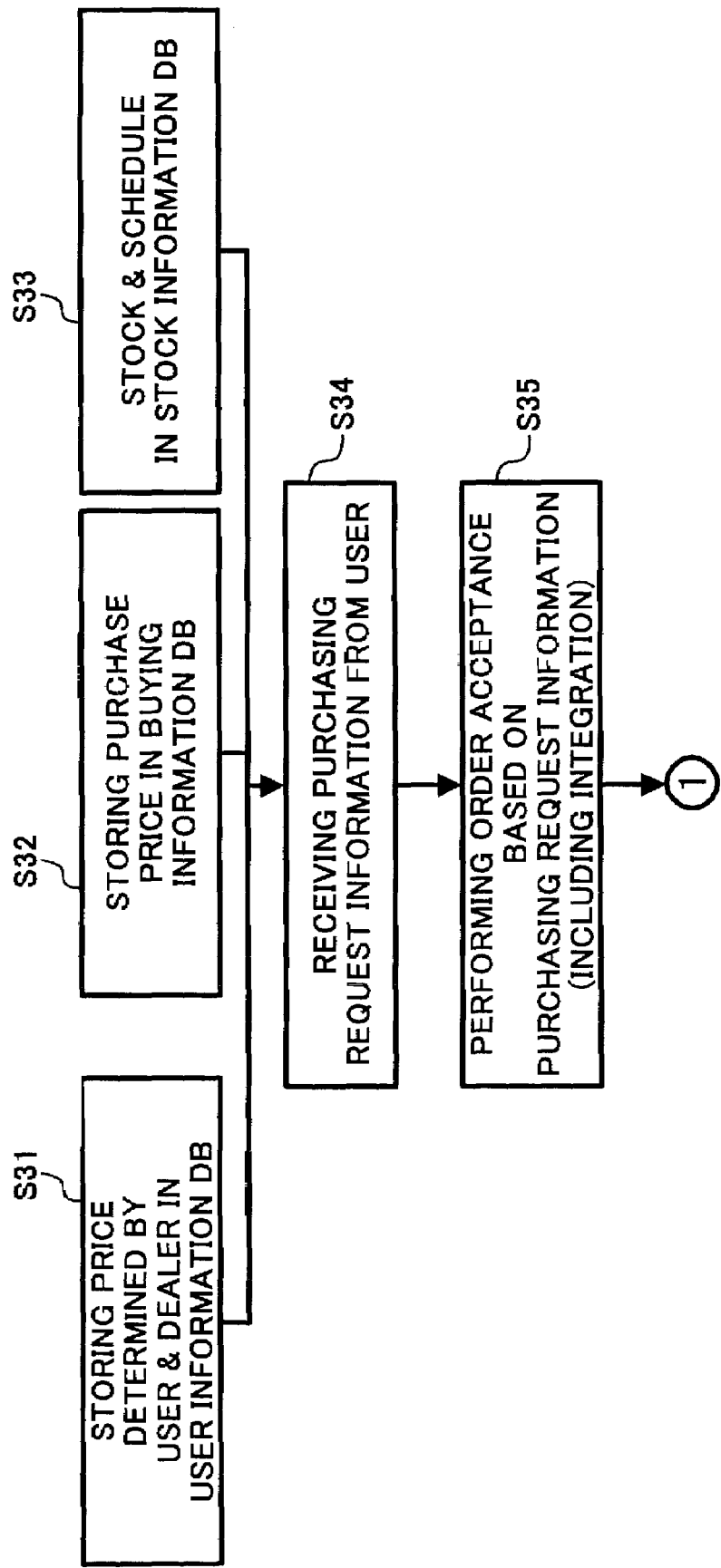

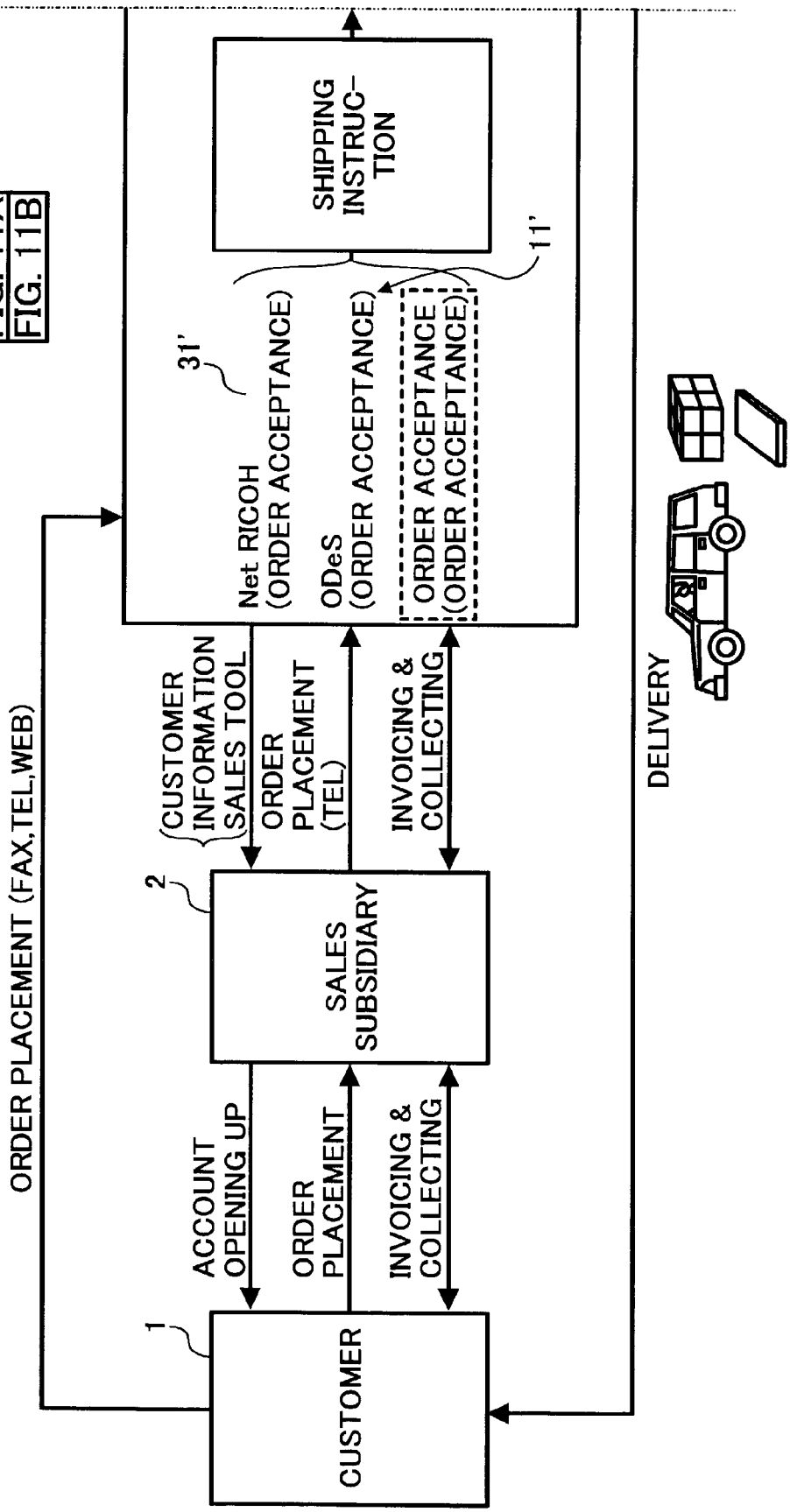

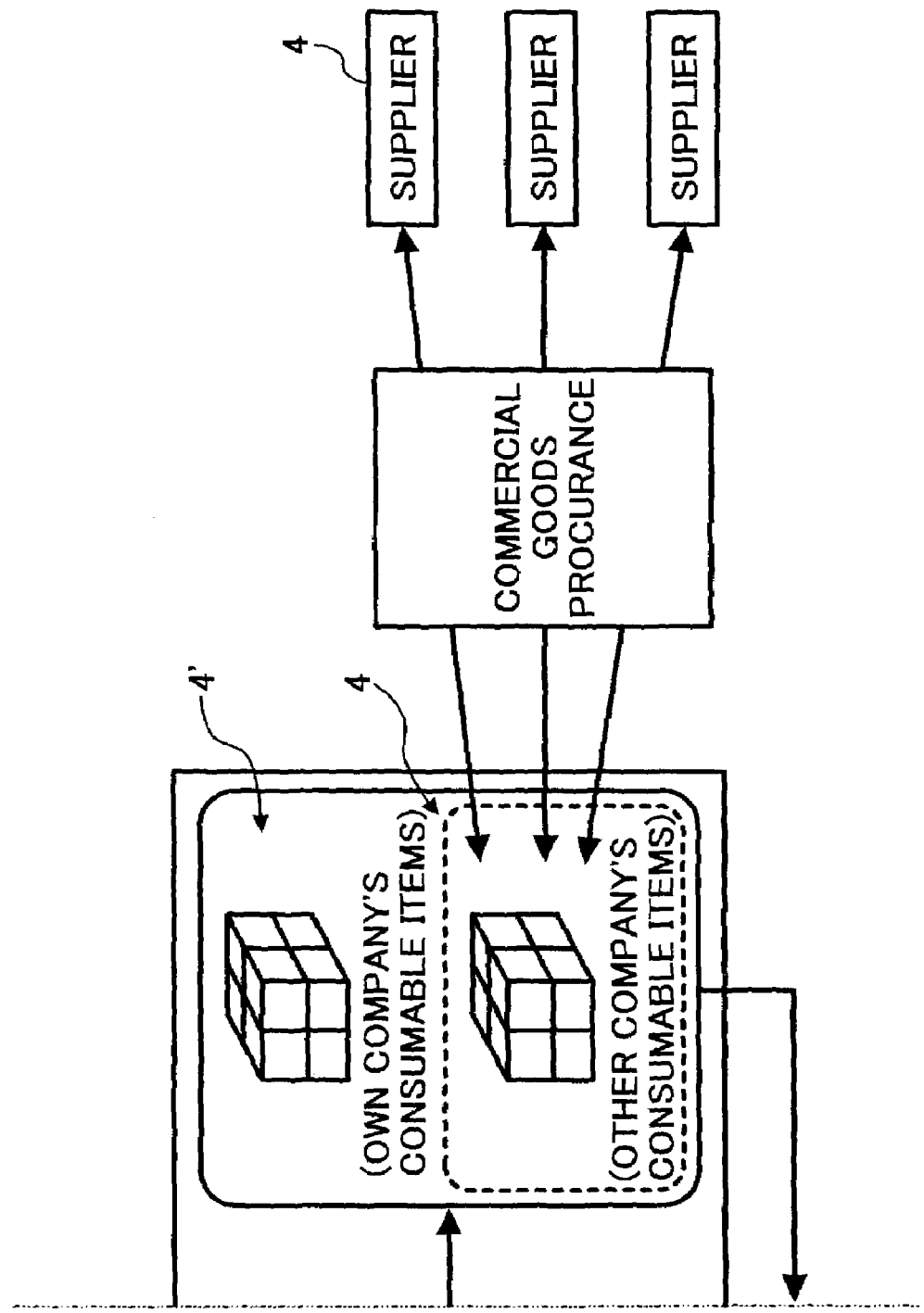

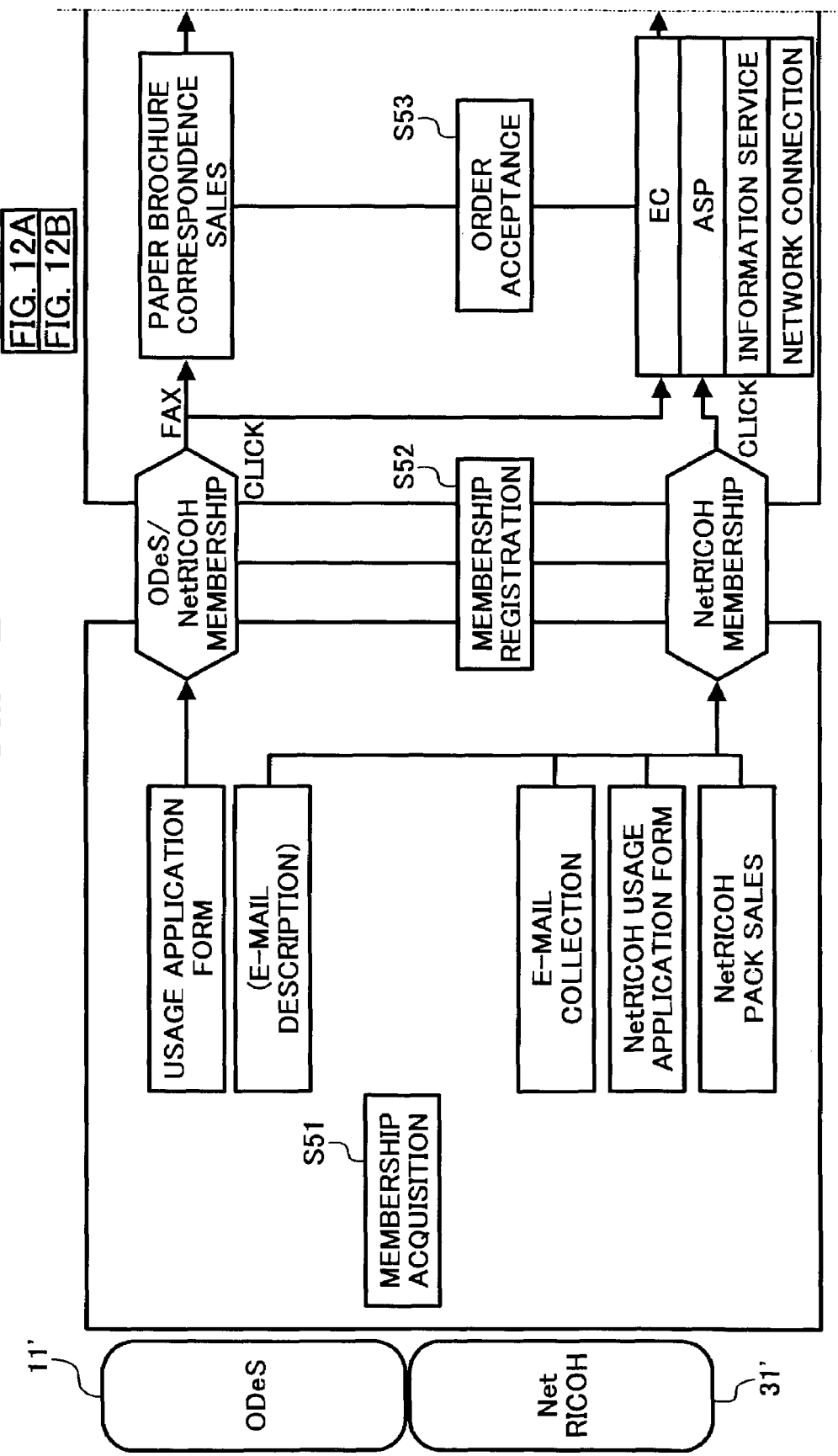

FIG. 13A
USAGE APPLICATION FORM

PLEASE FILL-IN WITHIN RIGID LINE FRAME BY CUSTOMER

| FIG. 13 | FIG. 13A | FIG. 13C |
|---|---|---|
|  | FIG. 13B | FIG. 13D |

FILL-IN EXAMPLE

WE COMPANY ACCEPT ODeS MEMBERSHIP APPLY FOR CODE & USAGE OF ODeS BROCHURE SALES SYSTEM, AND EXECUTE SIGN OR PLACE SEAL AS FOLLOWS

DATE ▭

※CUSTOMER TEL NO. ▭    CUSTOMER FAX NO. ▭    PERSON IN CHANGE OF ORDERING ▭

※

| | | | |
|---|---|---|---|
| COMPANY NAME | ANONYM<br>"O" BUSINESS COMPANY<br>PLEASE PRECISELY FILL IN AS IT DEFINES NAME OF DELIVERY DESTINATION | RESPONSIBLE PERSON NAME<br>Mr. ODESU   STAMP | |
| UNIT NAME | ANONYM<br>GENERAL AFFAIRS | RESPONSIBLE PERSON NAME<br>Mis. RICOH   STAMP | |
| COMMERCIAL GOODS DELIVERY DESTINATION | ANONYM<br>ODeS BUILDING<br>★ PLEASE, FILL IN BUILDING NAME, FLOWER & ROOM NUMBERS etc., IN DETAIL | | |

FIG. 13B (SALES PERSON FILLS IN BY MUTUAL CONSENT WITH CUSTOMER)

| ORDERING COMMERCIAL GOODS NO. | COMMERCIAL GOODS NO. | SALES PRICE MULTIPLY RATE (%) | ORDERING COMMERCIAL GOODS NO. | COMMERCIAL GOODS NO. | SALES PRICE MULTIPLY RATE (%) |
|---|---|---|---|---|---|
| | | | | | |
| | | | | | |
| | | | | | |
| | | | | | |
| | | | | | |
| | | | | | |
| | | | | | |

FIG. 13C

| DESIRED TRANSPORTATION PATTERN | ALL DAY | HALF DAY |
|---|---|---|
| REQUEST FOR RETURN MAIL SERVICE AT THE TIME OF ORDERING | NEEDED | NEED LESS |

| PAYMENT CONDITION | EVERY MONTH DUE DATE PAYMENT DATE |
|---|---|
| PAYMENT WAY | 1, AUTOMATIC MONEY TRANSFER<br><br>2, BANK TRANSFER<br><br>3, CASH COLLECTION<br><br>4, OTHERS |
| FILLING IN SIGHT WHEN A BILL IS USED (RECKON FROM DATE) | |

FIG. 13D

| CREATION | PROOFMARK | INPUT |
|----------|-----------|-------|
|          |           |       |

| BROCHURE TRANSMITTAL FROM ODeS |
|--------------------------------|
| SALES COMPANY BRINGS BROCHURE  |

| FIRSTLY RINGS REGISTRATION THIS TIME |
|--------------------------------------|
| RINGS REGISTRATION IS COMPLETED      |

NAME OF SALES COMPANY (CD)

PERSON IN CHARGE

TEL (CONTROL ITEMS)
CUSTOMER CODE □□□□□□□□

SPECIAL NOTE
(DELIVERY CONDITION·
MULTIPLE APPLICATION
DESTINATION FORMS
ATTACHMENT etc.)

FIG. 14A

| FIG. 14 | FIG. 14A |
|---|---|
| | FIG. 14B |
| | FIG. 14C |

ODeS ORDER SHEET    /SHEET    SELLING OFFICE | TOKYO RICOH Co.,Ltd. | 408

TRANSMISSION DIRECTION ←

| ORDER DATE | | | |
|---|---|---|---|
| NAME OF CUSTOMER | UEDA Co.,Ltd. | | |
| CUSTOMER CODE | 11203002 | | |
| CUSTOMER TEL NUMBER | 32701711 | | |
| NAME OF DESTINATION | | | |
| DESTINATION TEL NUMBER | | | |
| PERSON IN CHARGE OF ORDERING | | ORDER NUMBER | |
| FULL IN EXAMPLE | 901300 | MY PAPER A-3 | 10 | CASE |

FIG. 14B

| | ORDERED COMMERCIAL GOODS CODE | NAME OF COMMERCIAL GOODS | QUANTITY | UNIT |
|---|---|---|---|---|
| 1 | 339191 | RIFAX TONER MAGAZINE TYPE 3 | | ITEMS |
| 2 | 339677 | STAMP CARTRIDGE TYPE 1 | | CASES |
| 3 | 614603 | RIFAX TONER MAGAZINE TYPE 2 | | CASES |
| 4 | 639746 | RIFAX TONER TYPE 2000 120G | | CASES |
| 5 | 908904 | CHIP BAG DISK TYPE 5 PIECES SET | | SETS |
| 6 | | | | |
| 7 | | | | |
| 8 | | | | |
| 9 | | | | |
| 10 | | | | |
| 11 | 444501 | USED UP TONER CARTRIDGE COLLECTION | | ITEMS |
| 12 | 444502 | USED UP TONER CONTAINER COLLECTION ITEMS | | ITEMS |

FIG. 14C

| | |
|---|---|
| ODeS SUPPORT MENU DESIGNATION<br>(CUSTOMER BEARS FEES IN APPLICABLE CASE)<br><br>☐ UNPACKING DELIVERY・EMPTY CARTON COLLECTION (650YEN PER ONCE)<br>☐ COMMERCIAL GOODS REPLACEMENT (FIRST-IN, FIRST-OUT)<br>☐ SHELFING DELIVERY (CHARGE-FREE)<br><br>PLEASE DESIGNATE BY MARKING OUT, NOT CHECKING | |
| DESIRED DELIVERY DATE-MONTH-DATE | |
| ・PLEASE CONFIRM DETAILS ONCE MORE BEFORE ORDERING<br>・INQUIRY SHOULD BE DIRECTED TO EITHER INQUIRY CENTER<br>(TEL 0120-701-653) OR MERCHANT | |
| ORDER FAX NUMBER   0120-302-680 | ODeS |

FIG. 16
<RELATION BETWEEN MACHINE CONTRACT CANCELING NUMBER & C/V SATISFACTION RATE>
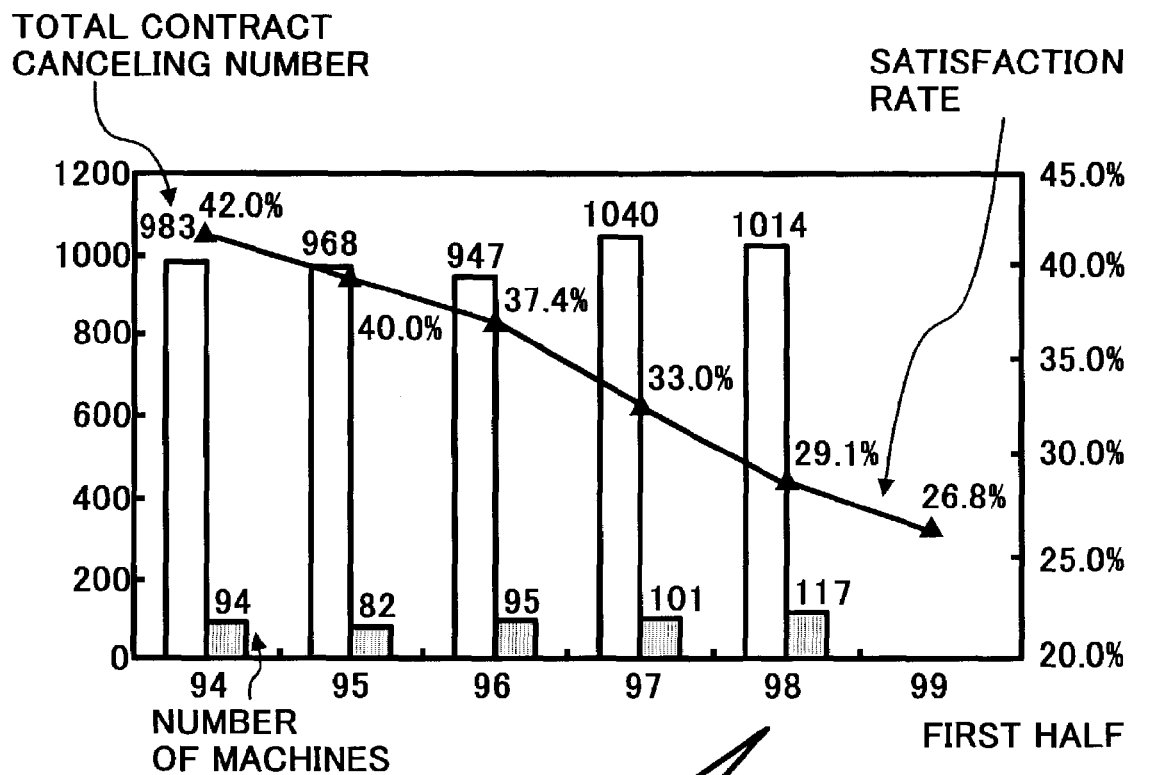
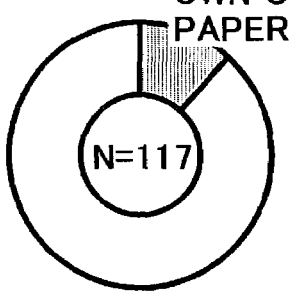
PAPER USAGE ANALYSIS OF CONTRACT CANCELING DESTINATION OF MORE THAN "C/V 5K" IN 1998 FISCAL YEAR
OWN COMPANY'S PAPER : 9%
N=117
OTHER COMPANY'S PAPER : 91%
※DECREASING OF C/V SATISFACTION RATE IS CONDUCTIVE TO MACHINE CONTRACT CANCELING
(PAPER SELLING IS NECESSITATED)

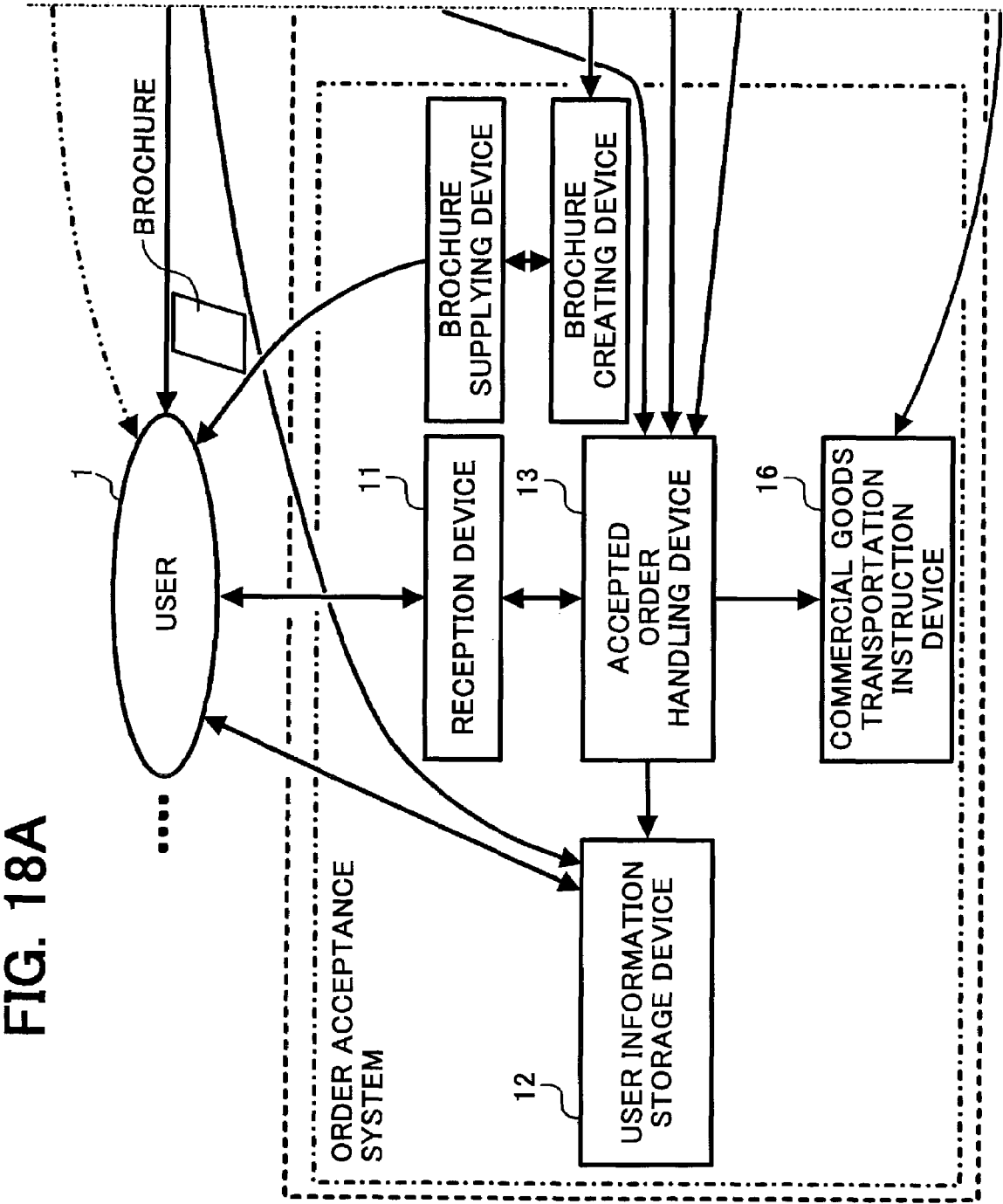

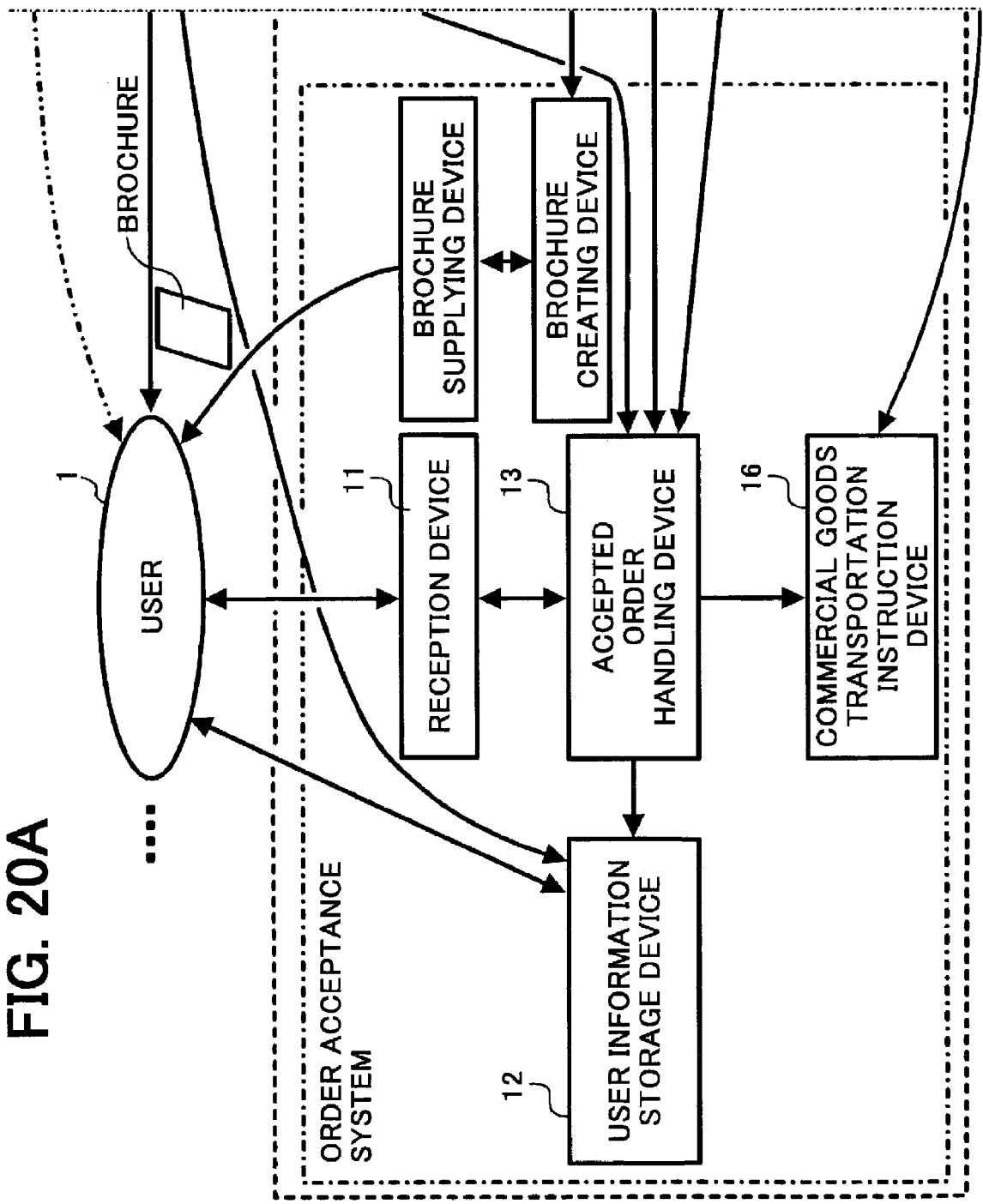

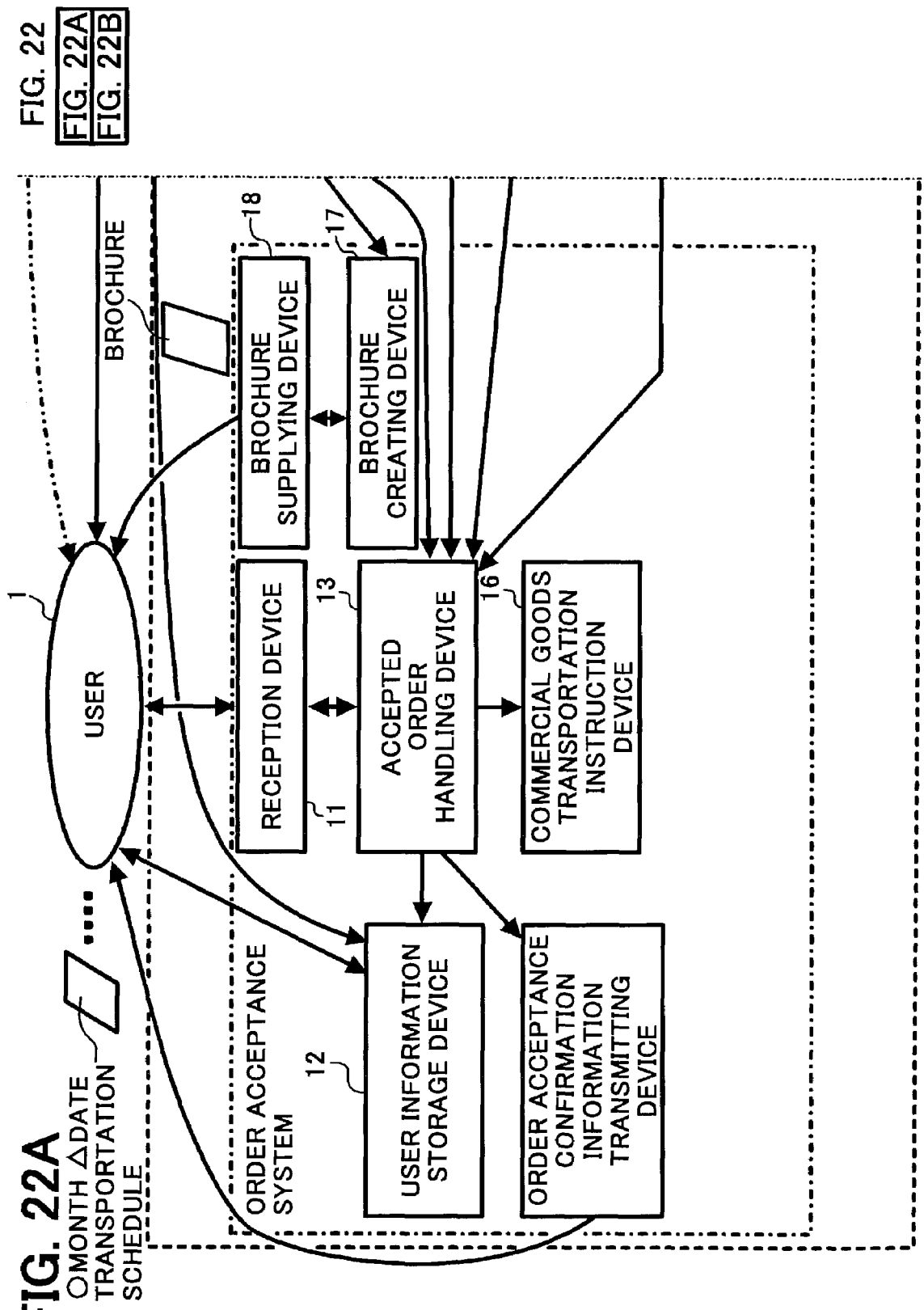

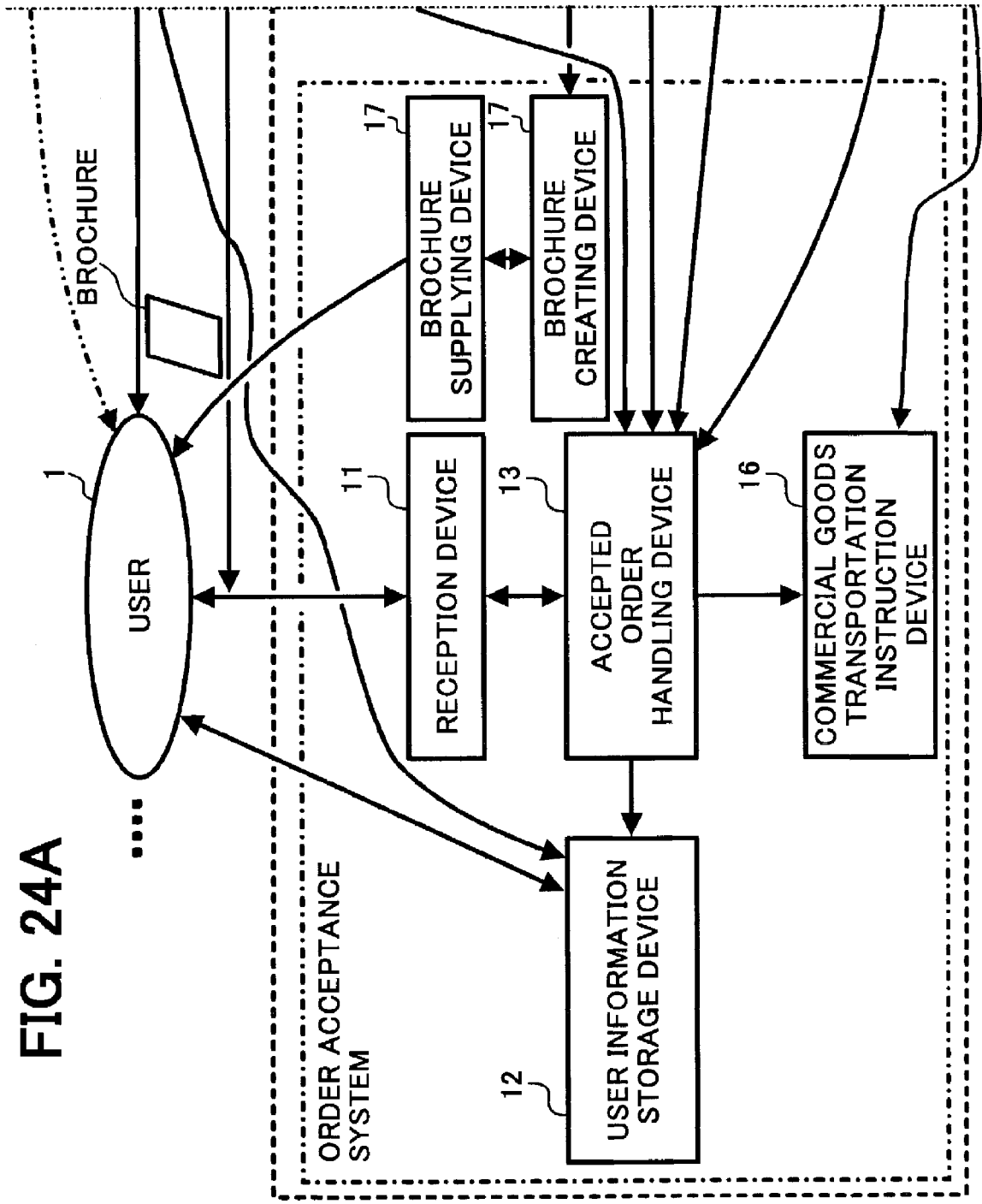

COMMERCIAL GOODS SUPPORT QUICK ORDER ~30

31 → ORDER FORM OF Mr., RICOH

※PLEASE INPUT ORDER QUANTITY & CLICK BUTTON INDICATING "ORDERING"

DELIVERY DESTINATION | RICOH Co.,Ltd. AOYAMA BUSINESS PLACE ▽
〒107-8544
Tokyo. Minamiku. Aoyama ○-○-○
03-3479-XXXX REORDERING OF COMMERCIAL GOODS : | ORDER OF COMMERCIAL GOODS NAME ▽ ~34 | ORDERING | NOT ORDERING

FIG. 26B

| COMMERCIAL GOODS NAME, SUPPORT NAME | CODE | SELL PRICE | QUANTITY |
|---|---|---|---|
| RICOH COPY KIT TYPE 1300 | 637082 | 18,800 YEN | 0 |
| RICOH PPC TONER TYPE 650 | 636925 | 20,800 YEN | 0 |
| RICOH COLOR PPC TONER TYPE A MAGENTA | 636103 | 2,500 YEN | 0 |
| RICOH COLOR PPC TONER TYPE A CYAN | 636102 | 2,000 YEN | 0 |
| RICOH COLOR PPC TONER TYPE A YELLOW | 636101 | 2,500 YEN | 0 |
| imagio COLOR TONER TYPE R BLACK | 636211 | 6,500 YEN | 0 |
| .... | .... | .... | .... |
| FULL COLOR PPC PAPER TYPE 6000 <58W> A3 | 632360 | 5,250 YEN | 0 |
| FULL COLOR PPC PAPER TYPE 6000 <58W> A4 | 632361 | 5,250 YEN | 0 |
| MY RECYCLE PAPER 100A 3T 目 | 902360 | 5,500 YEN | 0 |
| MY RECYCLE PAPER 100A 4T 目 | 902361 | 4,000 YEN | 0 |
| MY PAPER 100A 3T 目 | 901300 | 5,500 YEN | 0 |

CONTACTING SALES

COMMODITY ORDER ACCEPTANCE AND TRANSPORTATION SYSTEM, METHOD, AND RECORDING MEDIUM

CROSS REFERENCE TO A RELATED APPLICATION

This application claims priority under 35 USC § 119 to Japanese Patent Application Nos. 2001-387776, and 2001-387798 both filed on Dec. 20, 2001, the entire contents of which are hereby incorporated by reference.

BACKGROUND OF THE INVENTION

1. Field of the Invention

The present invention relates to a system, method, program, and recording medium for accepting an order and transporting a commodity.

2. Discussion of the Background Art

The office consumables market has become increasingly competitive, in recently years, as illustrated in FIG. 15. To satisfy increasingly diverse purchasing needs (e.g. one stop ordering, shorter delivery times), a variety of different sources for products have become available. Further, a customer may now visit a variety of online websites, retail stores, and mail-order sources to select office consumables. A sales analysis of businesses entering this market indicates a tendency to increase product lines and inventories, allowing one stop ordering, and the provision of commodities from one's own company or from another company capable of satisfying a customer's needs. In addition, there are a variety of ordering methods. That is, convenient Internet ordering (sometimes referred to as "one click" order) may be provided in addition to ordering by fax and telephone. A mail order service using the Internet allows a consumer, who desires to purchase a commodity, to access commodity information displayed on an Internet page and to select a desired commodity based upon the displayed information.

As to an actual condition of a mail order service in the writing material business group, each company begins operation by creating their own business as a surrogate business (distributive trade) for a customer.

Specifically, each company introduces an operation with a relatively larger company, a relatively smaller company, and an individual. As a selling method, a brochure may be prepared, and a fixed price may be displayed in the brochure. A practical sales price is determined through negotiation with a customer's service assistant (SA). A commodity is sold at the sales price, or orders are awaited. Further, a method is available in which a discount price is displayed as a sales price and orders may be awaited. In such an environment, acceptance of orders using the Internet may amount to between 15% and 30% of total sales.

It is determined that there is a minimum amount, per order, that is necessary to maintain an acceptable profit margin. Further, in addition to writing material, OA consumable items of PC series, such as toner, paper, etc., office electronic appliance, office furniture, and daily commodity or the like may also be sold.

FIG. 16 is a chart illustrating an example of a relationship between the number of machines sold by an OA instrument dealer whose agreement is cancelled, and a C/V satisfactory rate. When looking at a present condition of the OA instrument dealer, as the C/V satisfaction rate decreases, the number of cancellations increases.

Thus, it is apparent that paper sales are essential. Then, to increase the C/V satisfaction rate and to keep re-capturing one's own customers, an alliance with a paper dealer is required.

There are several reasons why a consumer of a major company may accept such sales. For example: cost effectiveness, simplicity of ordering method (i.e. easy retrieval, facsimile), next day delivery, and anytime-available ordering. In addition, one stop ordering is important for individual consumers and small companies. A small-scale customer may purchase all commodities at one stop (ordering). However, a larger-scale customer of some level separately uses an ordering destination in accordance with a commodity. Examples of complaints and demands from consumers may include lack of prompt response, transportation, lack of assortment of commodities per a category, and the delivery of incidental services, such as the collection of used commodities, the collection of packing material after unpacking, delivery to a designated shelf, etc.

The purchase needs of customers are inclined to be diverse. Specifically, short delivery time, one stop ordering (i.e., reduction of procurement costs), etc., of various manufacturer's consumable items, a moderate purchase price, detailed delivery accessory service, variation of ordering manners (simple ordering method) from a telephone to facsimile or Web, and purchasing and collection of recycle goods due to enhancement of environment consciousness are sought.

FIG. 17 is a chart illustrating an example of a mail order sales system that does not use the Internet as a main channel. A manufacturer (or vendor) may employ the mail order sales system as a main channel, using a sales company or their own sales person. As indicated by reference numeral 41, an order may be accepted from a user who places the order using an order form via a telephone or facsimile. The order may be transmitted to the vendor's backbone operation system (designated RINGS in FIG. 17). The backbone operation system may inform the user of a delivery date. The backbone operation system transmits order acceptance information to a terminal of an O/E (Order Entry) system. The O/E terminal places an order of inventory to a central office. As illustrated by reference numeral 42, a sales company may respond to user inquiries regarding price and commodity specifications, article returns, urgent transportation requests and the like. A manufacturing company (i.e., a central office) may respond to inquiries about delivery date, transportation time, inventory confirmation, requests for additional commodities, cancellation of a commodity, and inquiries about reception of a facsimile.

Customer needs for commodities (or products) and for support (i.e., services) may be diverse. Consequently, a manufacturer that relies solely on its own company's commodity and support services may fail to satisfy a customer. Further, if commodities or support services are sold at a discount, a consumer may fail to appreciate the discount unless the actual price is also displayed.

SUMMARY

Accordingly, an object of the present invention is to address and resolve the above and other problems. The above and other objects are achieved according to the present invention by providing a novel commodity order acceptance and transportation system. The system may include: a reception device configured to receive purchase request information including user information, commodity ordering information and/or support service requesting information, the commodity ordering information transmitted from any one of facsimile, telephone, and electronic mail, an order acceptance processing device configured to consolidate purchase request information received by the reception device and process an accepted order in accordance with the purchase request information, a purchase information storage device configured to store a purchase price of a commodity and support service purchased from a provider thereof, a user information storage device configured to store a sale price of a commodity and support service determined by a user and a dealer together with personal information of a user, a commodity transportation instructing device configured to instruct a provider to transport a commodity or provide a support service included in the purchase request information in accordance with an order reception process performed by the order acceptance processing device by referring to information stored in the purchase information storage device and user information storage device.

The invention further includes an invoicing device configured to invoice payments for the commodity and/or support service included in the purchase request information to the user and/or dealer in accordance with the sale price of the commodity and/or support service stored in the user information storage device and the personal information of the user.

In another embodiment, a Web reception device is configured to receive purchase request information including user information, commodity ordering information, and/or support service request information. The purchase request information is transmitted from a user to a Web server via the Internet. A user information storage device is configured to store sales prices of a commodity and/or support service received by the reception device together with personal information of a user, the sales prices being determined by a user and dealer, the user information storage device storing sales prices of a commodity and/or support service received by the Web reception device together with personal information of a user, the sales prices being determined by a user and dealer is supplied.

In yet another embodiment, a purchase price changing device is provided so as to change a purchase price of a commodity and/or support service stored in the purchase information storage device in accordance with a result of compiling payment amounts for the commodities and/or support service services stored in the user information storage device.

In yet another embodiment, a purchase price changing device is provided so as to change a purchase price of a commodity and/or support service stored in the purchase information storage device in accordance with a total number of items of the commodity and/or a frequency of support service stored in the user information storage device.

In yet another embodiment, a purchase price changing device is provided so as to change a purchase price of a commodity and/or support service stored in the purchase information storage device in accordance with a total amount of payments for commodities and/or support services.

In yet another embodiment, a purchase price notifying device is provide so as to provide notice that a purchase price has changed via the purchase price changing device, the purchase price notifying device may be included in an operation acceptance processing device. The terminal apparatus of the provider is connected to the commodity order acceptance and transportation system via a network.

In yet another embodiment, a purchase price confirmation device is provided so as to allow confirmation of a change in a purchase price, the purchase price confirmation device being included in a terminal apparatus of the provider.

In yet another embodiment, a purchase price confirmation device is provided to quote and allow the confirmation of a purchase price stored in the purchase information storage device. The purchase price confirmation device is included in a terminal apparatus of the provider, and the terminal apparatus is connected to the commodity order acceptance and transportation system via a network.

In yet another embodiment, one of providers administrates a commodity order acceptance and transportation system that includes an inventory information storage device configured to store inventory information related to a commodity and/or schedule information related to support service manpower. An inventory confirmation device is included and configured to confirm the feasibility of providing an ordered commodity and/or support service in accordance with the information stored in the inventory information storage device. A transportation date determining device is configured to determine a transportation date of a commodity included in the purchase request information in accordance with a result of the confirmation of inventory and the purchase request information. An order acceptance confirmation information transmitting device is configured to automatically transmit the transportation date determined by the purchase request information and the transportation date determining device to a user as order acceptance acknowledge using a facsimile or electronic mail. The commodity transportation instruction device instructs to transport the commodity on a particular date.

In yet another embodiment, only a sales price of a commodity and/or support service highly frequently purchased is stored in the user information storage device per a user.

In yet another embodiment, a brochure creating device configured to create a purchase requesting form and brochure in accordance with a sales price and personal information stored in the user information storage device; and a brochure providing device configured to provide the purchase requesting form and brochure to a user.

BRIEF DESCRIPTION OF DRAWINGS

A more complete appreciation of the present invention and many of the advantages thereof will be readily obtained as the same becomes better understood by reference to the following detailed description when considered in connection with the accompanying drawing figures, wherein:

FIG. 6 is a flowchart illustrating an example of a method of accepting and transporting a commodity order executed in the system of FIG. 5.

FIGS. 11A and 11B are charts collectively illustrating one embodiment of a commodity order acceptance and transportation system according to the present invention.

FIGS. 12A and 12B are flowcharts collectively illustrating an example of a procedure starting from membership registration to commodity transportation performed in the embodiment of FIG. 11.

FIGS. 13A. 13B, 13C, and 13D are charts collectively illustrating one example of a usage requesting form for an OdeS.

FIGS. 14A, 14B, and 14C are charts collectively illustrating one example of an order sheet for the OdeS.

FIG. 16 is a chart illustrating an example of a relation between a number of cancelled machine contracts with an OA instrument dealer and a C/V satisfactory rate.

FIGS. 18A and 18B are charts collectively illustrating an example of a commodity order acceptance and transportation system as another embodiment according to the present invention.

FIGS. 20A and 20B are charts collectively illustrating an example of still another embodiment of a commodity order acceptance and transportation system according to the present invention.

FIGS. 22A and 22b are charts collectively illustrating an example of still another embodiment of a commodity order acceptance and transportation system according to the present invention.

FIGS. 24A and 24B are charts collectively illustrating an example of still another embodiment of a commodity order acceptance and transportation system according to the present invention.

FIGS. 26A and 26B are charts collectively illustrating an example of a payment amount offering device included in the system of FIG. 25.

PREFERRED EMBODIMENT OF THE PRESENT INVENTION

Figure 1:
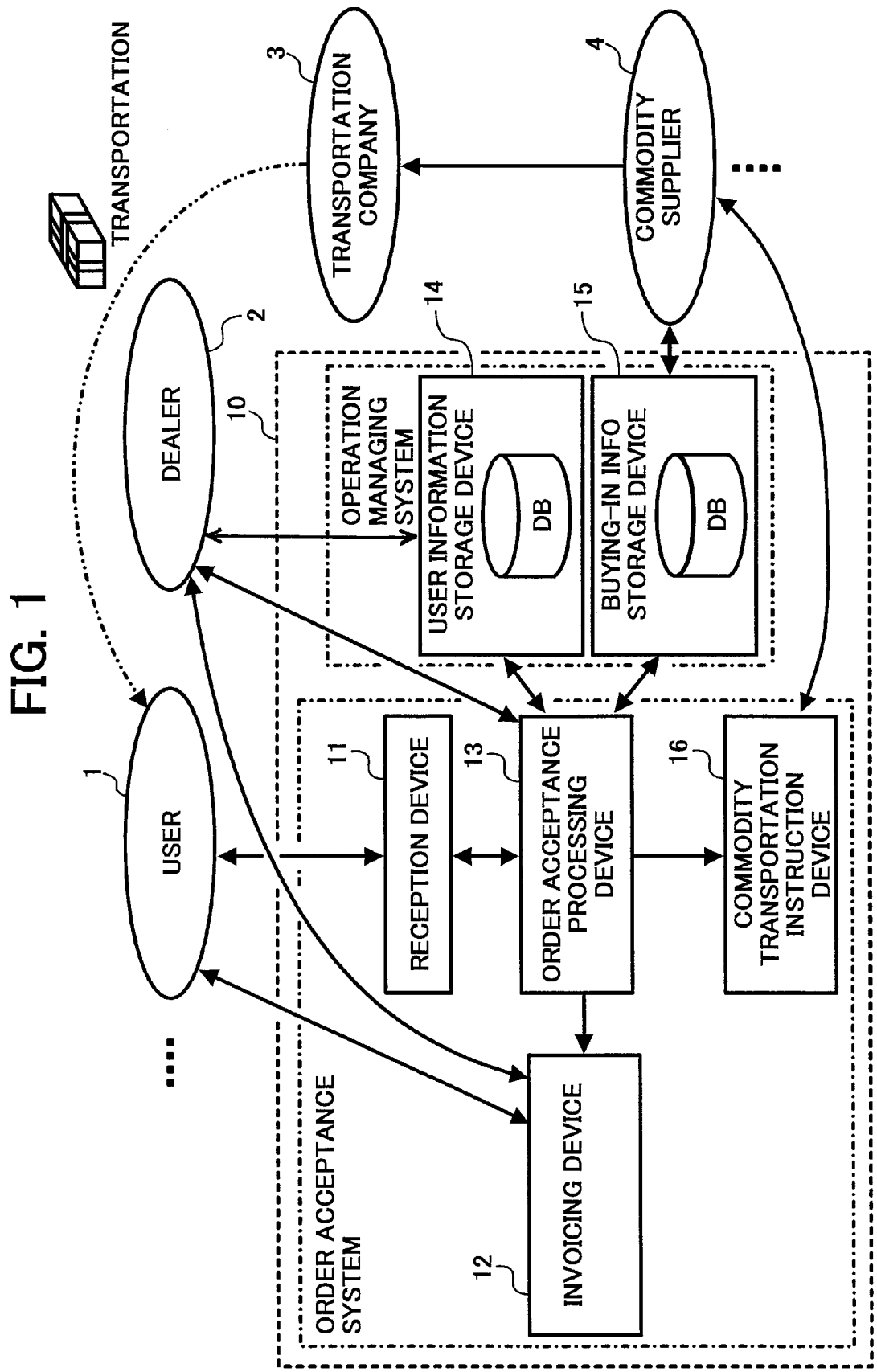
FIG. 1 is a chart illustrating an example of one embodiment of a commodity order acceptance and transportation system according to the present invention.
Figure 2:
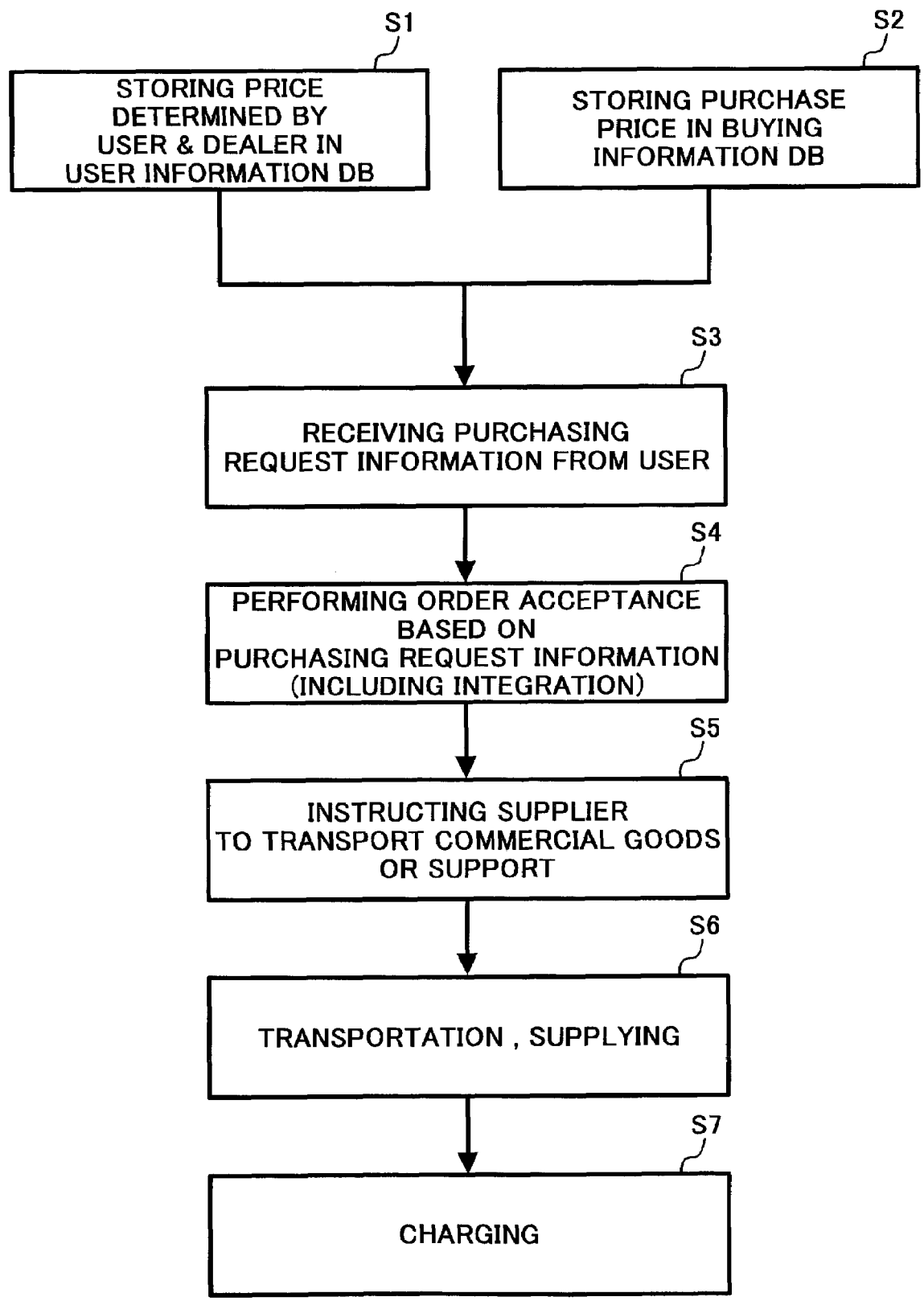
FIG. 2 is a flowchart illustrating an example of a method of accepting and transporting a commodity order executed in the system of FIG. 1.

FIG. 1 is a chart illustrating one example of a commodity order acceptance and transportation system according to the present invention. FIG. 2 is a flowchart illustrating an example of a commodity order acceptance and transportation method of the system of FIG. 1. The commodity order acceptance and transportation system 10 (hereinafter also occasionally referred to as "the present system") allows an administrator (e.g. a manufacturer) to sell its own commodities as well as another company's commodities to a user 1 via any one of a facsimile, a telephone, and electronic mail. The present system is a system related to the invention disclosed in Japanese Patent Application No. 2000-374376 filed by the present applicant. The present system is capable of providing a user 1 with commodities and support services from one's own company as well as another company. A system that handles only the commodity and support services of another company and not one's own company is initially described in the present embodiment. However, a feature in which the commodities and support services of both one's own company and another company are handled may be adopted, as mentioned later.

As shown in FIG. 1, the present system may include a reception device 11, an invoicing device 12, an order acceptance device 13, a commodity transportation instruction device 16, a user information storage device 14, and a purchase information storage device 15. For the sake of simplicity, the devices 11, 12, 13, and 16 may be described as devices included in an order acceptance system. The devices 14 and 15 may be described as devices included in an operation administration system.

Further, each of the devices (except for the reception device 11 and a portion of a later-described brochure providing device (e.g. a mailing device, used when a brochure is mailed)) may be operated by a computer. In such a situation, a program operating the computer may be stored in a server and executed. The server and various databases stored in a later-described storage device may employ conformations such that the databases are either physically included in the server or separated but connected thereto via a network. Further, each of the databases may be separated or integrated.

In short, every type of configuration is allowable if functions of these databases may be exerted. For example, a conformation of the server device may be a computer including a server function having a hierarchical structure, such as a server for network connection use (e.g. a Web server, when a later-described Internet connection is needed), an authentication server for authenticating each user, a database administration server for administrating various databases, etc. A computer may be sufficient for storing a program for executing the respective functions of later-described devices. The program may include a graphical user interface to enable a user to readily use the respective devices. Further, a transportation instruction to a provider 4 may be executed to a client apparatus of the provider 4 via the network. Also, processing of a dealer 2 may be executed from a client of the dealer 2 via the network (not shown). Further, the network may be formed from the Internet connected by a wired or wireless private line (including a line of an optical fiber) or telephone line. The network may be formed from the Intranet or Extranet using the Internet. Further, the private use line may be configured by a WAN (Wide Area Network) or MAN (Metropolitan area Network).

In the illustrated business managing system, the user information storage device 14 may store sales prices of a commodity and/or support services, determined by a user 1 and a dealer 2, together with individual information related to the user (in step S1). The sales price stored in the user information storage device 14 may reflect the price of a user's frequently purchased commodity, or a user's frequently requested support service. A sales price determined from various parameters, such as membership/non-membership, purchase frequency, etc., may be stored before receiving an order in the user information database (DB) that stores these parameters and user information. When storing, the dealer 4, for example, may use a client apparatus and may access the server device of the present system and may store the parameters and user information in the user information DB via an order acceptance processing device 13. The purchase information storage device 15 may store purchase prices of a commodity and/or support service from the supplier 4 of the commodity and support service (in step S2). Prices of commodities and support services and another costs are preferably stored in a purchase database ("DB") that stores information of respective commodities and support services.

Purchase request information that may be transmitted by any one of fax, telephone, and electronic mail is received by a reception device 11 (in step S3) in the order acceptance system. The purchase request information may include user information, such as a name, a membership number (in a case of a membership registration system), etc., capable of identifying a user 1, commodity ordering information, and/or support service requesting information. The support service represents various services, such as various settings as to an ordering commodity and another existing commodities, replacement and transportation of consumable items, etc. Subsequently, in the order acceptance processing device 13, the purchase request information received by the reception device 11 are consolidated, and order acceptance processing is performed in accordance with the purchase request information received from the user 1 (in step S4). Subsequently, a commodity transportation instruction device 16 instructs an appropriate provider 4 to transport and provide a commodity and/or support service included in the purchase request information while referring to various information stored in the purchase information storage device 15 and user information storage device 14 in accordance with the order acceptance processing performed by the order acceptance device 13 (in step S5).

The instruction represents that the administrator purchases a commodity or support service from the provider 4. The provider 4 executes transportation of the commodity and provides support service to the user 1 in accordance with the instruction (in step S6).

Such transportation and provision are arranged by a transportation company 3 serving as a delivery company or a company owned by the provider. When support service request information is included in the purchase request information, the delivery company is instructed to execute the support service included therein at the time of delivery of the commodity. An invoicing device 12 invoices expenses of a commodity and/or support service included in the purchase request information to one of the user 1 and dealer 2 in accordance with a sales price of the commodity and personal information of the user 1 stored in the user information storage device 14 (in step S7). It is preferable to invoice the user 1 and/or dealer 2 by making out a bill (before confirming delivery), confirming the delivery, and its result. Further, such invoicing may be performed before the step S6. The invoice provided to the user 1 is for the expense of the commodity and support service and includes a charge for service of the dealer 2 to be paid thereto. Invoices for the dealer 2 are for an amount determined by subtracting a charge for service of the dealer 2 from expenses for a commodity and support service. Invoicing to a user 1 may be built in the order acceptance system to be automatically performed by it. However, due to commodity trading based upon an agreement signed between a user 1 and dealer 2, either the above-described manner is employed, or the above-described system preferably automatically makes and transmits a bill out for a user 1 to the dealer 2, so that the dealer 2 may invoice the bill to the user 1 as it is or after processing of it.

The above-described support service request information preferably includes information related to a request for collection of a recyclable commodity, such as a used toner cartridge, a used toner container, a used paper, etc. Further, a used paper private use box is preferably provided to the user, and the used paper is preferably collected, when it is full with the used paper and support service request information indicating used paper collection is generated by a user. Further, the support service request information may be intended to include various information, such as designated place delivery to deliver at a place that a user designates, unpacking delivery to unpack when a commodity is delivered, empty carton collection to collect an empty carton unnecessary for a user, commodity replacing delivery to perform first-in first-out, delivery date designation to designate a delivery date of an ordered commodity, urgent transportation to request for urgent transportation, fixed quantity periodical transportation to periodically transport a designated commodity so as to stock a predetermined quantity thereof, etc. It is preferable that the delivery company is instructed to perform user support service in accordance with such information. No problem essentially occurs in processing the present system, if a processing order, except for steps S3, S4 (except for consolidation), S5, and S6, is changed for an already registered user, for example.

According to the present system, since the other company's (i.e., commodity provider) commodity and/or support service may be handled without their stocks (i.e., since the other company carries an inventory), the present system may respond to diversified purchase needs of a customer for a commodity and support service. Further, due to preparation of various purchasing manners such as facsimile, telephone, electronic mail, etc, a user may purchase a commodity and support service by, its preferred purchasing manner.

Figure 3:
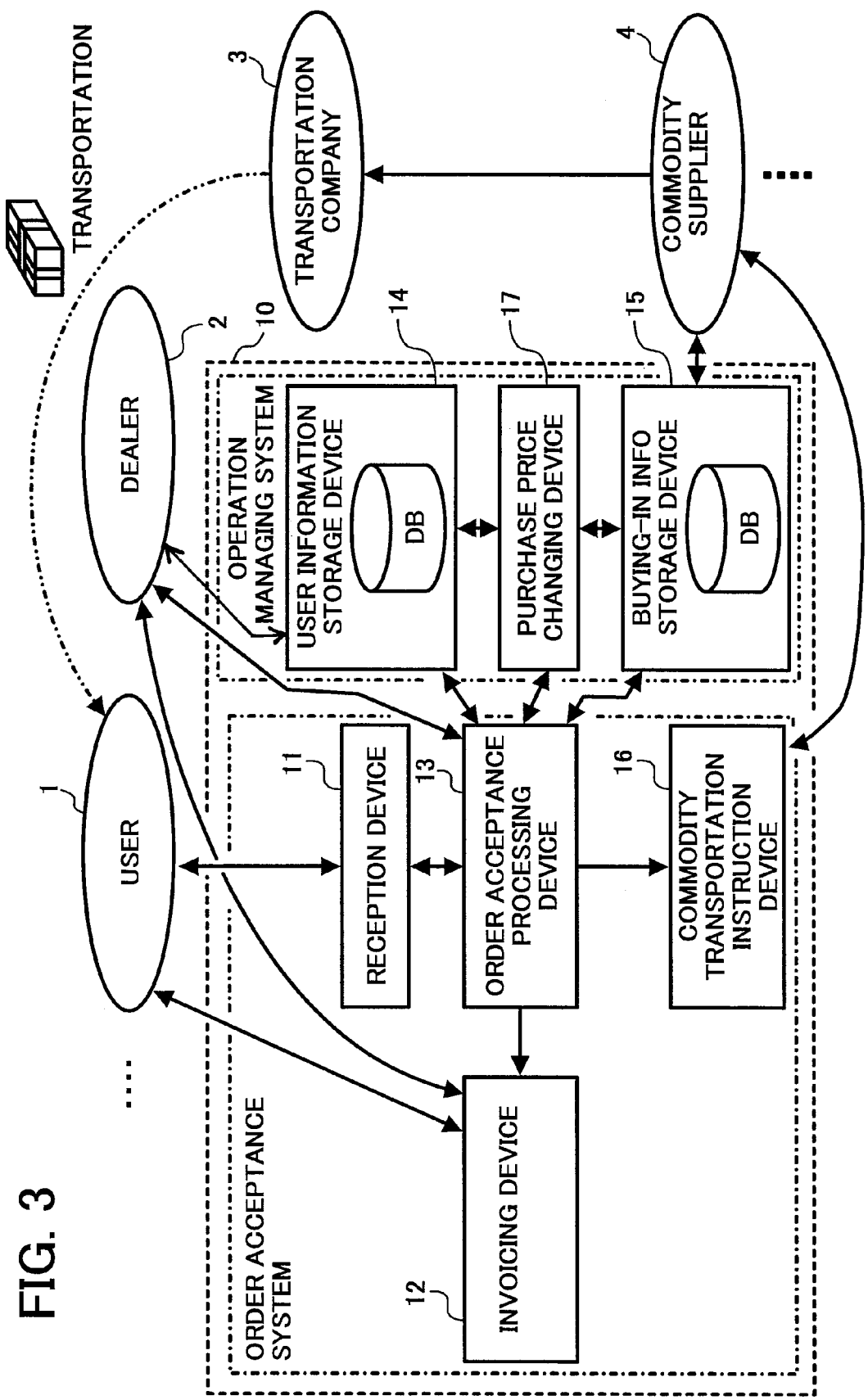
FIG. 3 is a chart illustrating an example of another embodiment of a commodity order acceptance and transportation system according to the present invention.
Figure 4:
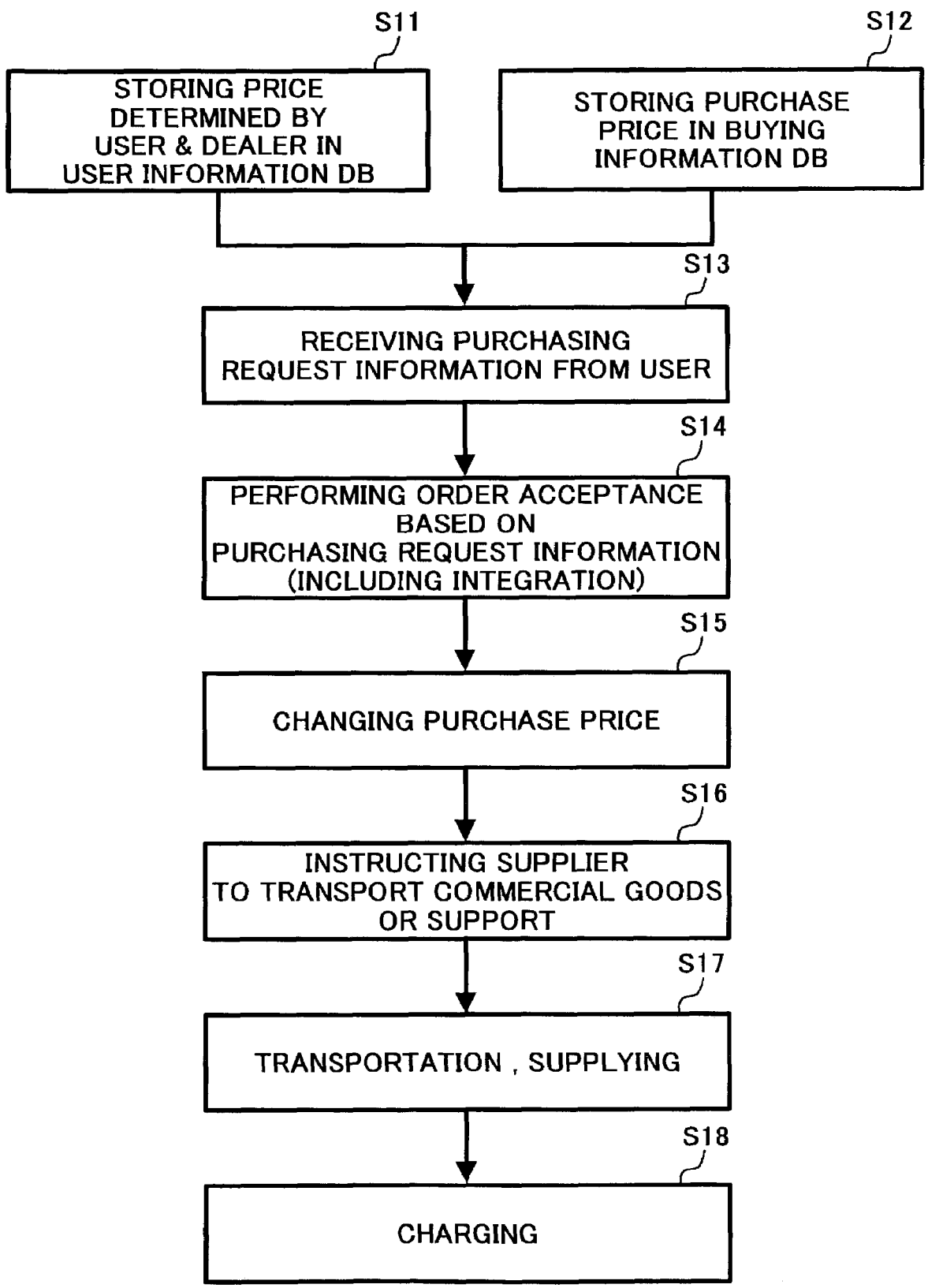
FIG. 4 is a flowchart illustrating an example of a method of accepting and transporting a commodity order executed in the system of FIG. 3.

FIG. 3 is a chart illustrating an example of a commodity order acceptance and transportation system of another embodiment according to the present invention. FIG. 4 is a flowchart illustrating an example of a method of the commodity order acceptance and transportation system of FIG. 3.

A commodity order acceptance and transportation system 10 of another embodiment according to the present invention (hereinafter referred to as a present system) includes a purchase price changing device 17 that changes a purchase price in addition to the system described with reference to FIGS. 1 and 2. The purchase price changing device 17 changes unit prices (purchase prices) of a commodity and/or support service stored in the purchase information storage device 15 in accordance with a result of compiling amounts of payment for the commodities and support services stored in the user information storage device 14 (in step S15).

Changes in the purchase price in accordance with the payment amounts total is calculated by multiplying an average of sales prices of users 1 for prescribed commodities or support services as it is by a prescribed rate, for example. Otherwise, the change may be determined by weighting respective sales prices of users in accordance with frequencies of purchasing of the users 1, and averaging those, and multiplying by a prescribed rate.

Steps S11 to S14 of FIG. 4 are similar to those S1 to S4 of FIG. 2. Also, steps S16 to S18 of FIG. 4 are similar to those S5 to S7 of FIG. 2. Thus, these similar steps are omitted to describe. FIG. 4 illustrates an example of a procedure such that the purchase price changing process follows the order acceptance process (in step S14). However, the changing process may be performed by any one of procedures. Further, as shown in FIG. 3, the purchase price changing device 17 is illustrated by premising that it carries out the changing process after the order acceptance process is carried out by an instruction from the order acceptance processing device 13.

The changing process for the purchase price, however, may be carried out when purchase request information of a user included in the user information DB is changed. Further, purchase prices for an order accepted commodity and support service may be set to decrease after an order acceptance process (e.g. after a prescribed number of times or time period of the order acceptance processes). The setting is preferably changed in accordance with a contract signed up between the provider 4 and administrator.

In another embodiment, the purchase price changing device 17 may change purchase prices of a commodity and/or support service stored in the purchase information storage device 15 in accordance with a number of commodities and a frequency of support service stored by the user information storage device 14. As a result, it matches to a commercial pattern in which a purchase price is subjected to a purchase number.

In another embodiment, the purchase price changing device 17 may change purchase prices of a commodity and/or support service stored in the purchase information storage device 15 in accordance with a sale price of a commodity and/or support service stored in the user information storage device 14 per a user. As a result, a relation between a purchase price and a sales price (i.e., an amount of payment) for a user may be maintained at a prescribed rate. Thereby, an administrator may obtain stable profit.

Figure 5:
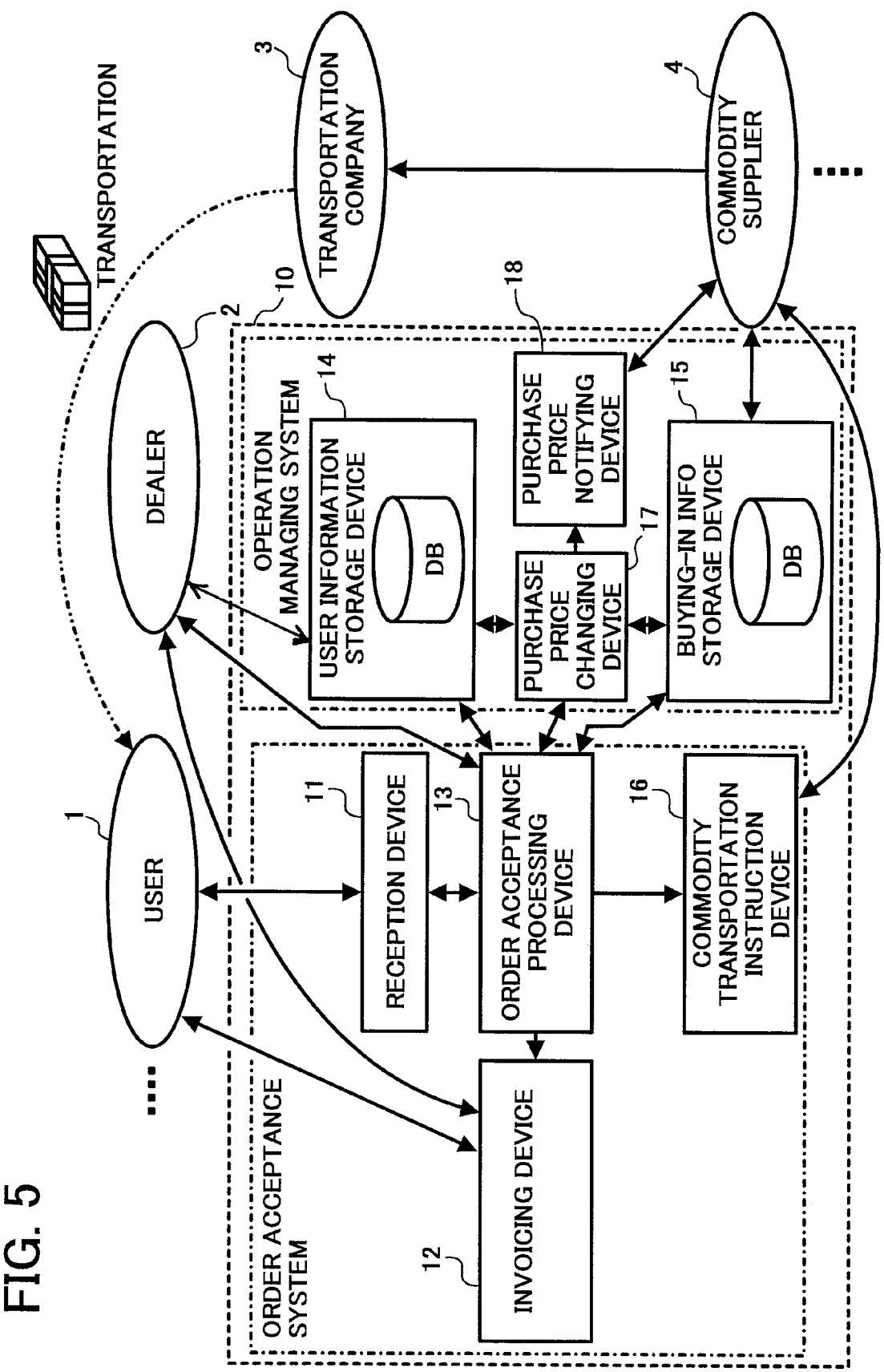
FIG. 5 is a chart illustrating an example of still another embodiment of a commodity order acceptance and transportation system according to the present invention.

FIG. 5 is a chart illustrating an example of a configuration of a commodity order acceptance and transportation system as another embodiment according to the present invention.

FIG. 6 is a flowchart illustrating an example of a method of the commodity order acceptance and transportation system of FIG. 5. A commodity order acceptance and transportation system 10 (hereinafter referred to as a present system) includes a purchase price notifying device 18 that reports a provider 4 of a purchase price in addition to systems of embodiments as described with reference to FIGS. 3 and 4. The purchase price notifying device 18 notifies a terminal apparatus of the provider, connected to the present system via a network (e.g. various connection configurations, such as Internet, Intranet, etc) of a purchase price changed (in step S25) by the purchase price changing device 17 (in step S26). Further, steps from S21 to S25 of FIG. 6 are similar to those from S11 to S15 of FIG. 4. Also, steps from S27 to S29 of FIG. 6 are similar to those from S27 to S29 of FIG. 4.

In another embodiment of the present invention, each of the systems described with reference to FIGS. 3, 4, 5, and 6 includes a purchase price confirmation device in the purchase price changing device 17 so as to cause the client terminal (e.g. a multiple purpose computer or mobile terminal, such as a PC), connected to the commodity order acceptance and transportation system 10 via the network, to confirm a change in a purchase price, and preferably reflect only a confirmed (approved) change. Further, as still another embodiment having a similar function, each of the systems described with reference to FIGS. 1 to 6 may include the purchase price conforming device in a commodity transportation instruction device 16, to cause the terminal apparatus of the provider 4, connected to the commodity order acceptance and transportation system 10, to quote and confirm a purchase price stored by the purchase information storage device 15.

Figure 7B:
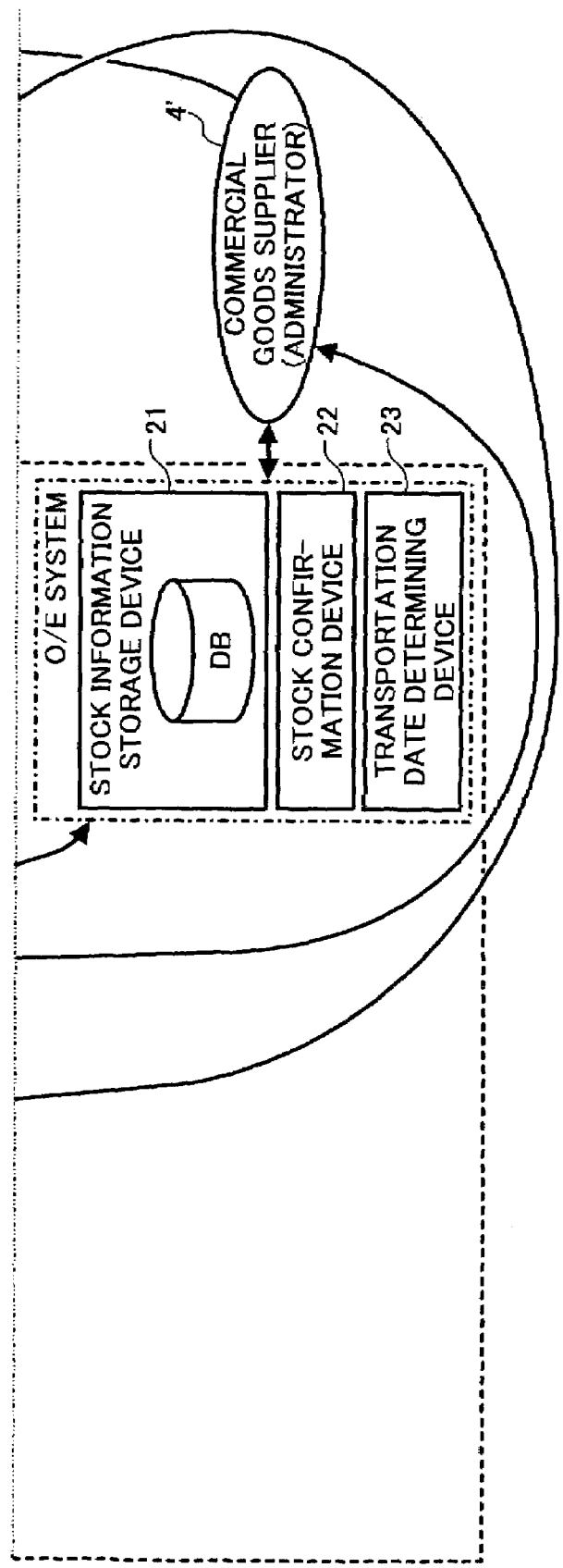
FIG. 7 is a chart illustrating an example of still another embodiment of a commodity order acceptance and transportation system according to the present invention.

FIGS. 7A and 7B are charts collectively illustrating an example of a configuration of a commodity order acceptance and transportation system of still another embodiment of the present invention.

Figure 8B:
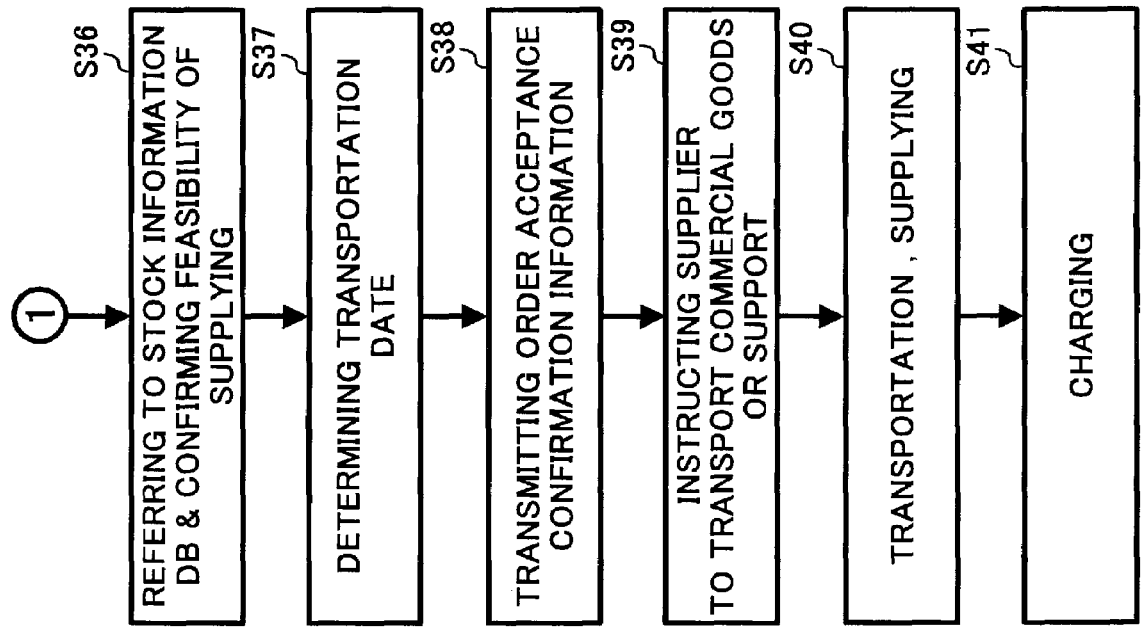
FIG. 8 is a flowchart illustrating an example of a method of accepting and transporting a commodity order executed in the system of FIG. 7.

FIGS. 8A and 8B are flowcharts collectively illustrating an example of a method for order accepting and transporting of a commodity in the system of FIG. 7. A commodity order acceptance and transportation system 10 (hereinafter referred to as a present system) of this embodiment of the invention is a system capable of providing commodities and support services from its own company (administrator) in the above-described embodiments of the invention. Specifically, one of the providers 4 is premised as a trader 4' administrating the present system 10. The present system further includes an inventory information storage device 21, inventory confirmation device 22, transportation date determining device 23, and order acceptance confirmation information transmitting device 24. For the sake of convenience, the order acceptance confirmation information transmitting device 24 is described as a device included in the order acceptance system. Each of devices 21, 22 and 23 is described as a device included in an order entry system (O/E system). Further, steps S31, S32, S34, S35, S40 and S41 of FIG. 8 are similar to those S1, S2, S3, S4, S6 and S7 of FIG. 2. Thus, similar description is omitted.

In the O/E system, the inventory information storage device 21 stores commodity inventory information and/or schedule information related to support service personnel (in step S33). Inventory information and schedule information are preferably stored in the inventory information DB. The inventory confirmation device 22 confirms if commodity and/or support service ordered may be provided based upon the information (included in the inventory information DB) stored in the inventory information storage device 21 (in step S36). This confirmation process is preferably executed after or before an order acceptance process in step S35. The transportation date determining device 23 determines a transportation date of a commodity included in the purchase request information in accordance with inventory confirmation results obtained by the inventory confirmation device 22 and the purchase request information (in step S37).

The order acceptance confirmation information transmitting device 24 automatically transmits the transportation date determined by the transportation date determining device 23 together with the purchase request information as order acceptance confirmation to a user by a facsimile or electronic mail (in step S38). The commodity transportation instruction device 16 generates an instruction to transport a commodity on the transportation date determined by the transportation date determining device 23 (in step S39).

Figure 9A:
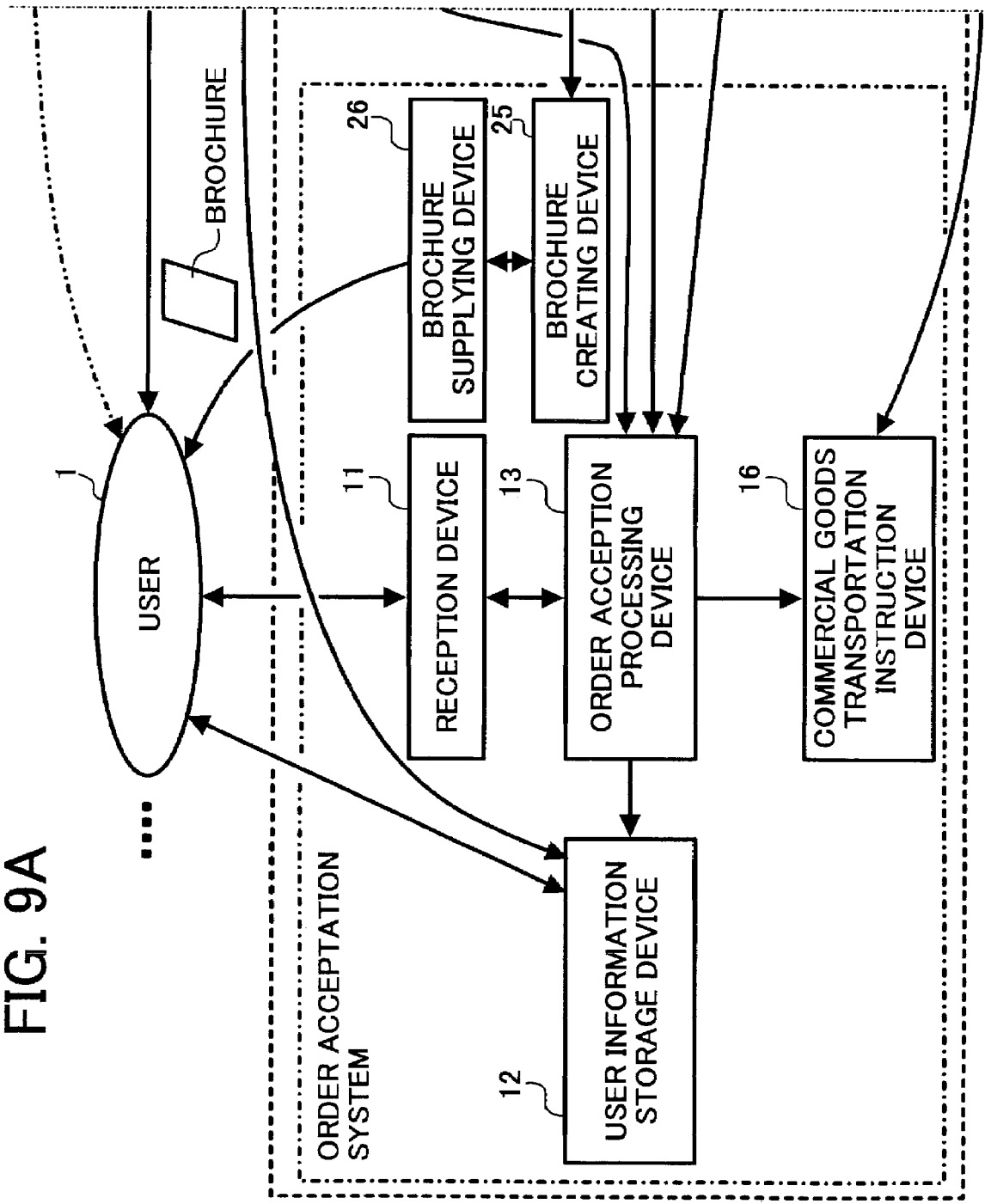
FIG. 9 is a chart illustrating an example of still another embodiment of a commodity order acceptance and transportation system according to the present invention.
Figure 9B:
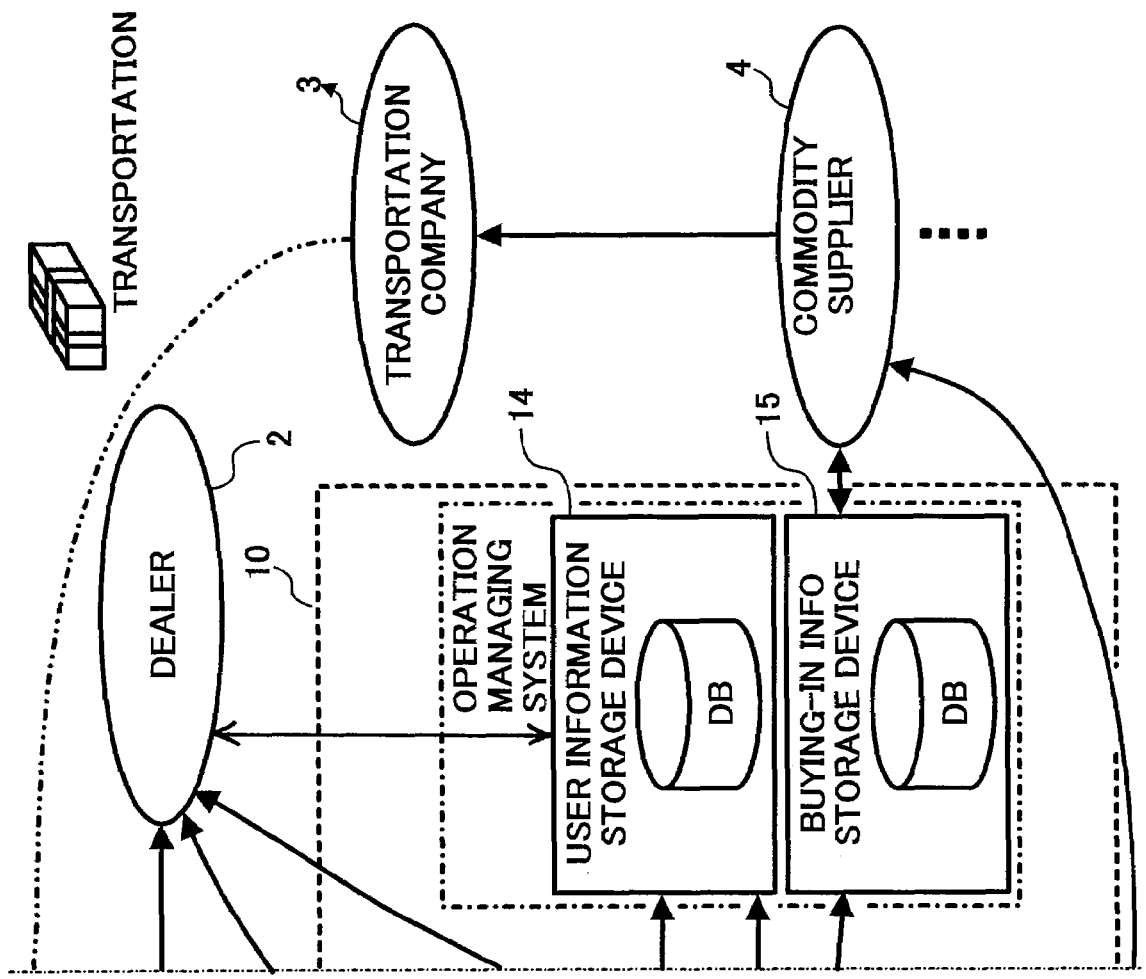

FIGS. 9A and 9B are charts collectively illustrating an example of another embodiment of a commodity order acceptance and transportation system according to the present invention. This embodiment of the commodity order acceptance and transportation system 10 of the present invention (hereinafter referred to as a present system) is a system capable of providing a user private use brochures in the above-described embodiments. The present system 10 includes a brochure creating device 25 and a brochure providing device 26. The devices 25 and 26 are described as a part of the order acceptance system of FIGS. 9A and 9B. The brochure creating device 25 creates a purchase request form and brochure of a commodity in accordance with a sales price and personal information of a user stored in the user information storage device 14. The brochure providing device 26 provides a user with respective of the purchase request form listing commodities and support services to be ordered and brochure created by the brochure creating device 25. As a providing method, they may be obtained when a user inputs a user ID on a home page through the Internet. Otherwise, they may be recorded in a recording medium such as a CD-ROM or duplicated and mailed.

Figure 10:
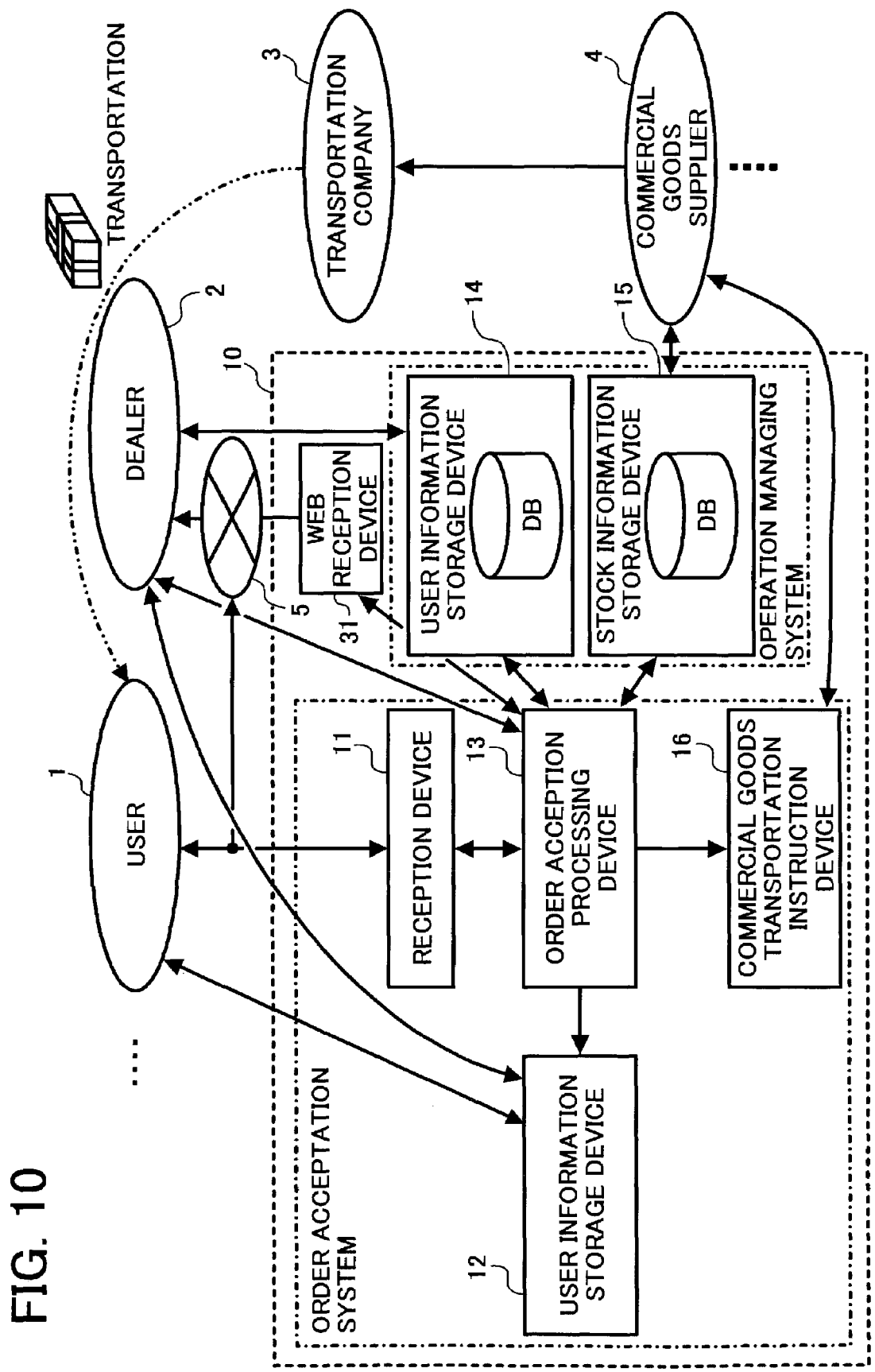
FIG. 10 is a chart illustrating an example of still another embodiment of a commodity order acceptance and transportation system according to the present invention.

FIG. 10 is a chart illustrating an example of another embodiment of a commodity order acceptance and transportation system. A commodity order acceptance and transportation system 10' of this embodiment (hereafter referred to as a present system) is a system capable of effecting purchases of commodities and support service by a web user through the Internet 5 in the above-described embodiments.

Specifically, the present system 10' includes a web reception device (a network reception device) 31 that receives purchase request information including user information and commodity order information and/or support service request information transmitted from the user (actually, a client apparatus such as a PC) to a web server through the Internet. Further, a difference from the above-described embodiments is as follows:

First, the order acceptance processing device 13 consolidates purchase request information received by the reception device 11 and web reception device 31. The user information storage device 14 stores a sales price, determined by a user and dealer, for a commodity and/or support service through the reception device 11, together with personal information of a user. The user information storage device 14 also stores a sales price of a commodity and/or support service through the Web reception device 31 together with personal information of a user. Further, as for the invoicing device 12, what is received by the web reception device 31 is preferably settled up previously on the network.

In another embodiment according to the present invention, an order acceptance system, for example, included in a commodity order acceptance and transportation system, may store frequently asked questions from the user and dealer together with answers thereto, and provide the user and/or dealer with the stored inquiry information in response to inquiry about a commodity and support service from a user and dealer. As a providing method, this information may be placed on a home page available via the Internet or brochure and the like. The inquiry information is useful for a dealer when holding a business meeting with a user, and a user friendly system may be established. It is preferable that the statistic of user personal information, a sales price, purchase request information or the like is taken and is reflected to inquiry information.

In still another embodiment, when a user signs a maintenance contract for an OA instrument and so on, a service person capable of executing the maintenance contract is allocated as a delivery person of a service agent. Simultaneously, the commodity transportation instruction device may instruct him or her to maintain the OA instrument at the time of delivery to the user.

Further, although a commodity order acceptance and transportation method and system are described above in respective embodiments, the present invention may be realized by a program causing a computer to execute such a method and a computer readable recording medium recording the program. Further, it may also be realized by a program, which causes a computer to function as a system or respective devices in the system, and a computer readable recording medium that is recorded with the program.

Herein below, an embodiment of a recording medium that stores program and data for realizing a function of a commodity order acceptance and transportation system according the present invention is described. As a recording medium, CD-ROM, optical magnetic disc, DVD-ROM, FD, Flush memory, and various types of ROM and RAM may be used. By causing these recording media to execute functions of systems of the above-described respective embodiments according to the present invention, and storing and circulating a program realizing a function of accepting and transporting commodity order, these functions are readily achieved. Then, the above-described recording medium is attached and read from an information processing apparatus such as a computer, or the program is stored and read from the recording medium included in the information processing apparatus upon need. Thereby, the function of commodity order acceptance and transportation of the present invention may be achieved.

Herein below, one embodiment of a commodity order acceptance and transportation system and method that builds in the above-described various embodiments is described. FIGS. 11A and 11B are charts collectively illustrating an embodiment of a commodity order acceptance and transportation system. The embodiment corresponds to diversion of a purchasing manner used when a user 1 as a customer purchases a commodity and support service. Initially, an office supply transportation service (herein after referred to as an Office supplies Delivery Service (ODes)) 11' serving as a reception device, and a "NetRicoh" 31' serving us a Web reception device for procuring commodities from not only an administrative or affiliate company 4', but also a plurality of suppliers 4. Commodities including the other company's may be purchased and stocked in a concentrated manner. However, the other company's commodity is preferably procured (i.e., a transportation request) in response to a purchase request from a user 1. Both the ODes 11' and NetRicoh 31' create (e.g. brochure, advertising subsidiary) and provide a sales company 2 with commodity inventory managing and sales promoting tools (preferably including customer confirmation such as purchase career). The sales company 2 performs sales activity to the user (customer), and performs user registration if the user is new.

The user 1 is enabled to order a commodity with the ODes 11' and NetRicoh 31' through Internet, Facsimile, and telephone. The ODes 11' and NetRicoh having accepted a commodity order from the user 1 delivers thereto (together with a delivery accessory service in a support service menu), and collects a sales price directly or via a sales company 2. Further, the ODes 11' and NetRicoh provide the sales company 2 with customer information, corresponding to an inquiry from a user about a commodity, and provides the user with commodity and purchase information. Further, a commodity may be provided at an optimal sales price for each customer. The ODes 11' side may provide one-stop ordering by a brochure published semiannually. In such a case, it is preferable to lower its price and create a brochure for each user 1 using a point system or the like, and providing the user 1 therewith. Further, the order acceptance center of the ODes 11' corresponds also to direct order acceptance from a user 1 through a telephone or the like. According to this embodiment, the direct order acceptance may be provided for customers across the country by a short delivery period (e.g. present day or day after). Further, direct inquiry from the customers may be handled by an inquiry center. An order via a sales company 2 by telephone as indicated by a dotted line in FIGS. 11A and 11B collectively illustrates a conventional manner.

Advantage of the administrator and sales company 2 is now described as one example. Benefits introduced by a sales activity according to the present invention (i.e., business betterment or the like by a new system) is finally distributed to a SA (service assistant), a CE (customer engineer), and a MG (manager), who have contributed thereto, as counter values for those duties. Specifically, It may be combined with a system that increases a reputation of an employee in accordance with the contribution. ODeS (Facsimile order acceptance) sales proceeds, a customer support service system (CSS: Automatic meter reading, Remote diagnosis, Automatic toner delivery), a performance system data reliance (PDR: Progress Degree in Reliability to a number of a counter of a Copier and Printer), a personal computer and device service (P&DS), a maintenance contract of a laser printer (at a time of sales or delivery), a M-Pac (maintenance package by a counter) contrast number, and a total copy volume (TCV) increasing rate or the like are exemplified. Advantage for the administrator is as follows:

Specifically, reduction of costs for order acceptance operations, reduction of load in confirming the operation responsible person, SA, and CE, Increasing the operational efficiency of the CE by reducing EM (emergency management) visits, reduction of order generating/accepting and transportation operation at a user contact point, minimization of lost credit obligation (i.e., avoiding collection leakage), shortening of a cash flow by quick registration, securement of a new profit source (i.e., profitable if malfunction rate is low), easy capturing of information related to an operational status of another company's IT instrument (making sales activity more efficient), increasing the operational efficiency of the CE by reducing the EM rate, and expansion of performance charge (PC) profits are realized.

Further, a user may enjoy the following advantages: reduction of cost for the order acceptance operation by one-stop ordering, reduction of operation confirmation, enjoying secure feeling due to remote monitoring, streamlining of the order acceptance operation, prevention of excessive invoicing or the like by reliably and precisely checking fees, reduction of instrument maintenance service fees, increasing instrument maintenance business efficiency (e.g. single window), reduction of repair fees, and maintaining the machine at high quality, are realized for example.

Figure 12B:
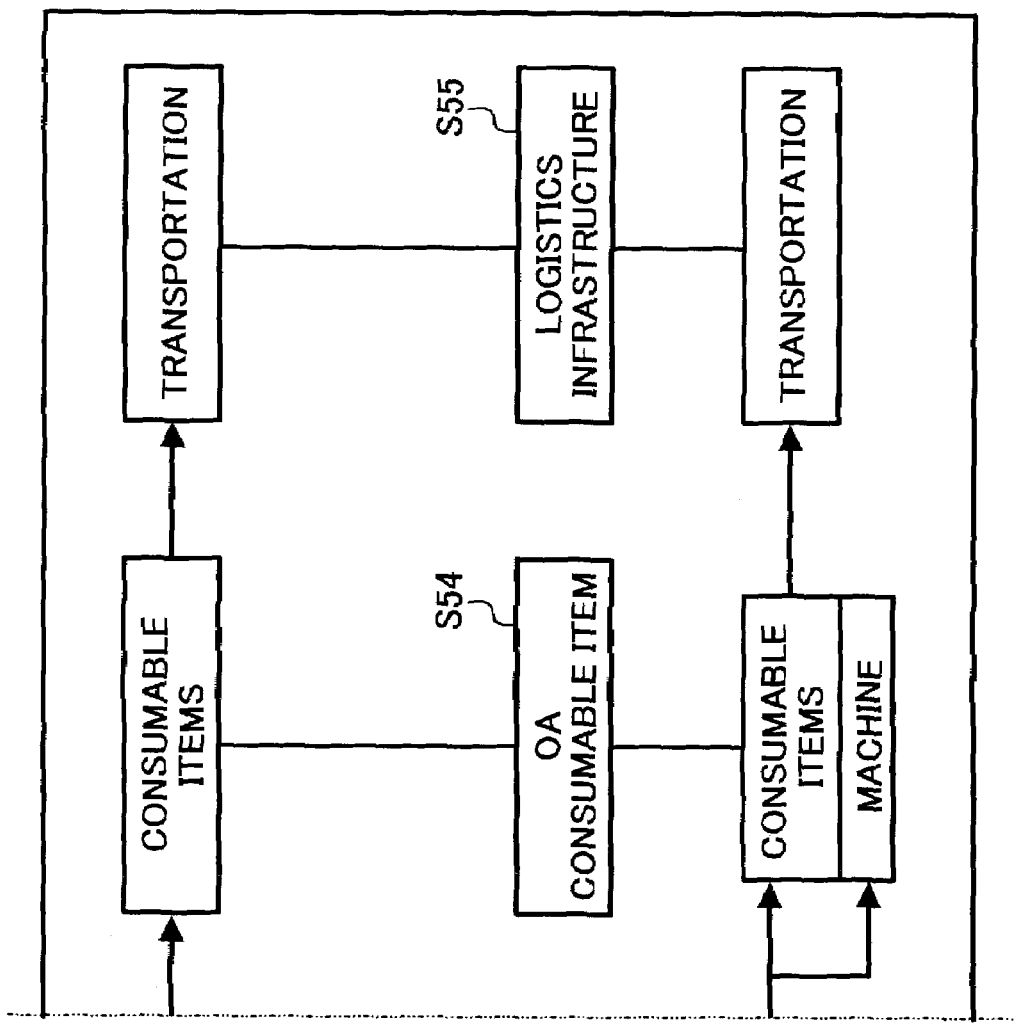
Figure 15:
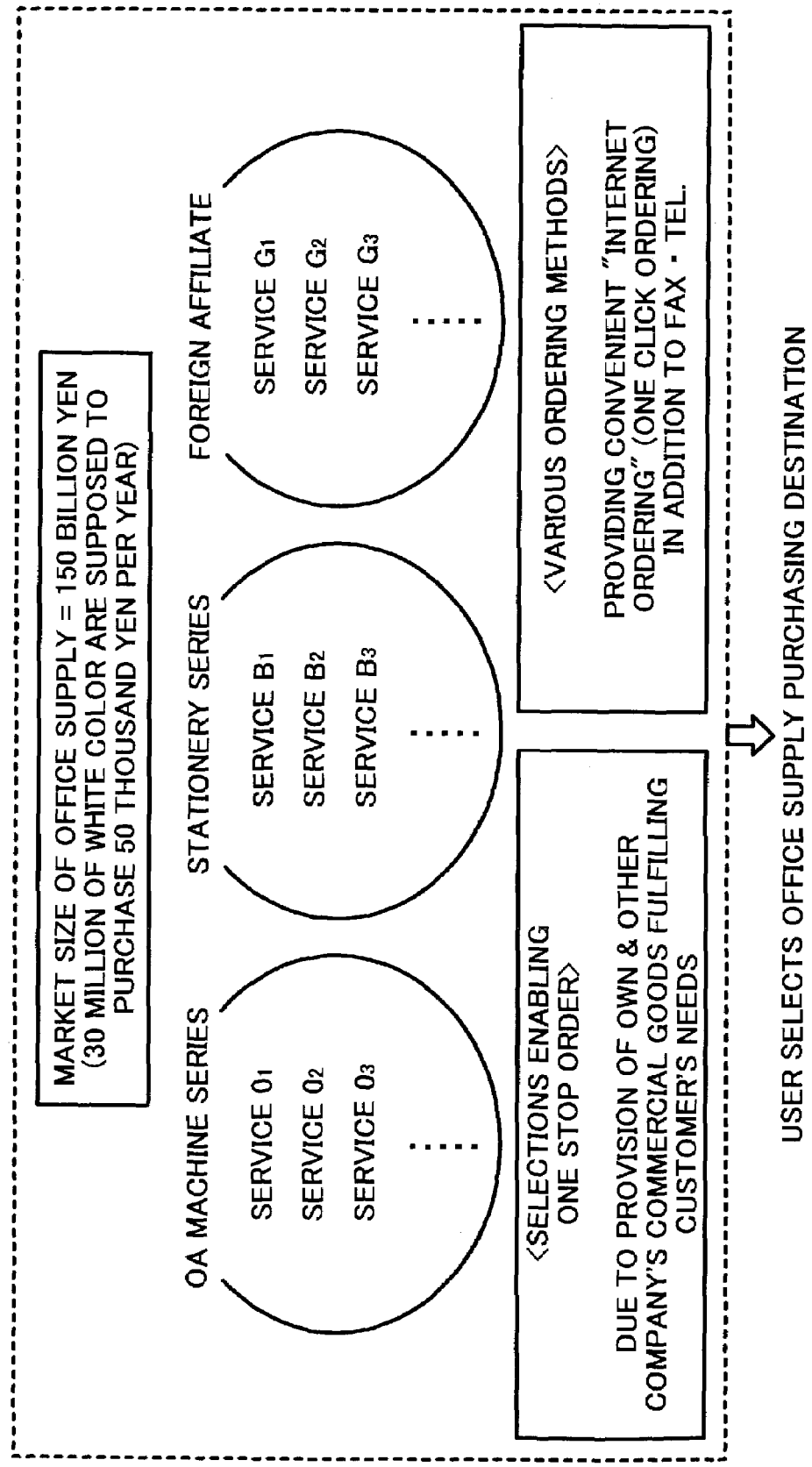
FIG. 15 is a chart illustrating an example of an environment of office consumable items.
Figure 17:
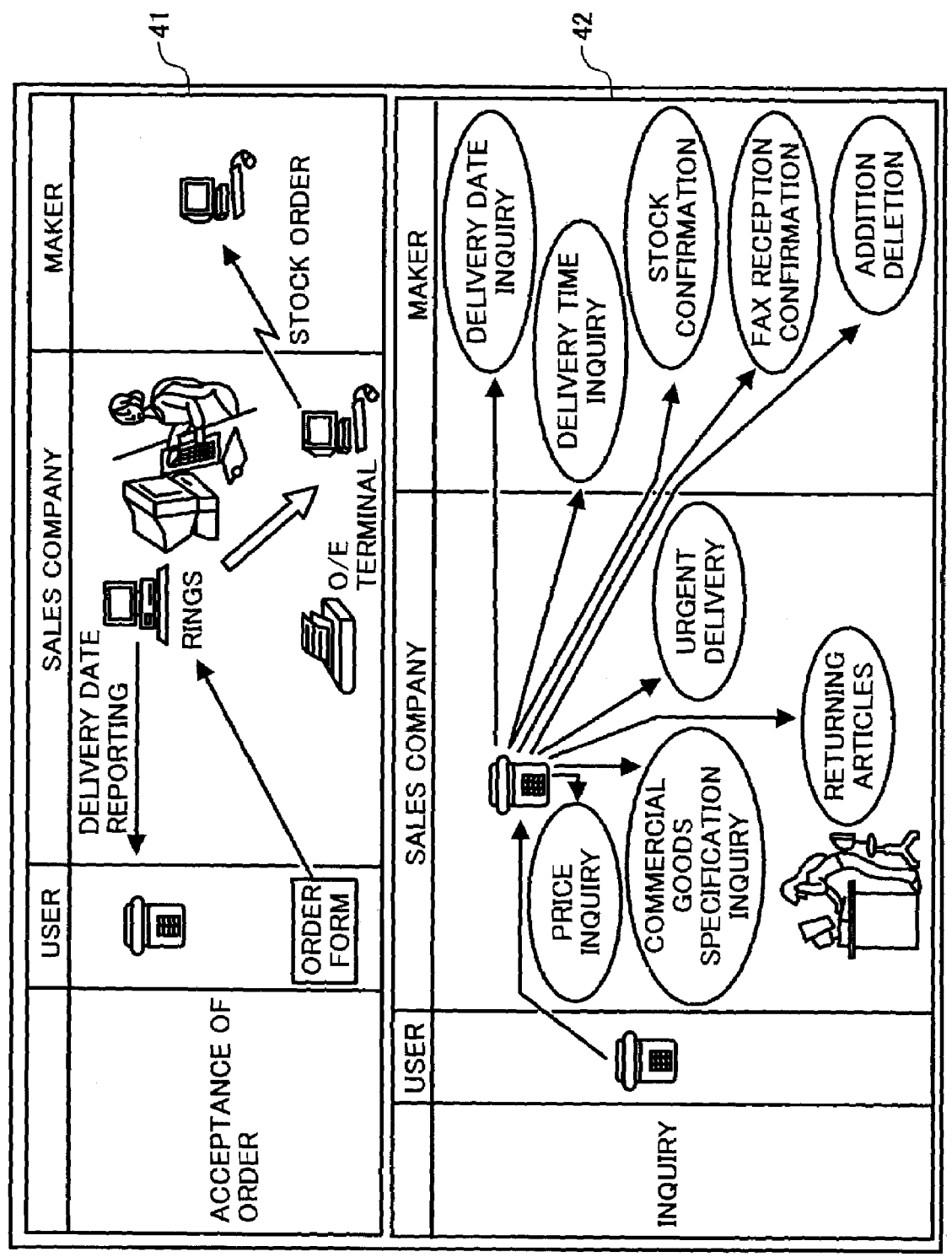
FIG. 17 is a chart illustrating an example of a mail order servicing method that does not employ Internet as a main channel.

FIGS. 12A and 12B are flowcharts collectively illustrating an example of a procedure started from a membership registration to commodity transportation according to the embodiment of FIGS. 11A and 11B. FIGS. 13A and 13B are flowcharts collectively illustrating one example of a usage requesting form for the ODeS. FIG. 14 is a chart illustrating one example of an order sheet for the ODeS. A procedure in the ODeS 11' side is now described.

First, when a membership is to be acquired (in step S51), a user requests a service by a usage requesting form. The usage requesting form requires a user's address, telephone and facsimile numbers, person in charge, and chairman in case of a company, and electronic mail address upon need. Further, as to a frequently purchased commodity, a sales company fills in a commodity name, commodity number, and sales price (% sales price) determined by negotiating with the user. Further, similar to a typical mail order service, a user code (i.e., a customer code), ways of payment and brochure distribution (e.g. either a sales company brings with itself or ODeS transmits thereof) are included. Further, in addition to a sales company, a person in charge, existence of registration in a backbone business system, and special notes, such as a transportation conditions, multiple destination chit attachments, etc., are preferably included. By inputting the request form, a membership registration is performed. Further, when a description of E-mail appears in the usage requesting form, it's registration may be performed as a membership of NetRICOH 31'.

Similar to a typical mail order service that uses a paper brochure, a customer is recommended to fill in a commodity number in an order sheet and send it by facsimile, when accepting an order (in step S53). A user (customer) name, user code, user telephone number, shipping address, shipping destination telephone number, person in charge of ordering, and order number or the like are filled in the ODeS order sheet. Otherwise, items related to a user other than ordering commodities may be pre-printed in the ODeS order sheet by default. Besides a code, commodity name, quantity, and unit of an order commodity including recycling of a used up toner cartridge, designation of the other support service menu executed in the ODeS and a desired delivery date or the like are preferably filled in.

From the other support service menu, unpacking delivery, empty carton recovery, commodity replacement (first-out first-in), and shelving delivery or the like are indicated together with fees. Subsequently, transportation of an OA consumable item commodity is instructed (in step S54), and performed by a logistics infrastructure (in step S55). As a result, the commodity is delivered to a user.

Herein below, a procedure in the NetRICOH system is described. Firstly, when a membership is acquired (in step S51), a user requests a service through a Web or service usage requesting form. Then, E-Mail information is provided. In addition, a sales packed with the other service is enabled. When the membership registration is completed (in step S52), and a commodity is to be ordered (in step S53), a user connects to the Internet and receives information related to the commodity or the like. The web may be provided from an ASP server. The information may include a user's private use sales price. The user electronically makes a payment in a similar manner to a typical electronic business transaction and orders a commodity. The web server receives the order. The following operation is similar to that performed in the ODeS 11'. Further, an OA consumable item logistic organizations for the ODeS 11' and NetRICOH 31' are preferably united. Further, OA consumable items of the ODeS 11' and NetRICOH 31' preferably handle the same commodity.

According to this embodiment, windows of maintenance administrating/repairing and consumable item ordering for a PC and peripherals may be integrated. As a result, labor of instrument administration and order of consumable items per a manufacturer, which have been bothersome so far, is reduced or eliminated. Further, demands of a customer for not only assortment but also one-stop service with regard to registration/order and payment may be satisfied. By performing customer registration and inputting user ID once, commodities on various sites may be purchased. In addition, every commodity purchase may be paid once, and every commoditie purchased at once may be transported at once. Also, one location of the window may correspond to an inquiry about various commodities and sites. Further, by handling the other company's commodities, and promoting its purchasing, a condition of usage of the other company's machine is analyzed. As a result, optimal suggestion for improvement may be made.

Still another embodiment is now described with reference to the drawings.

Figure 18B:
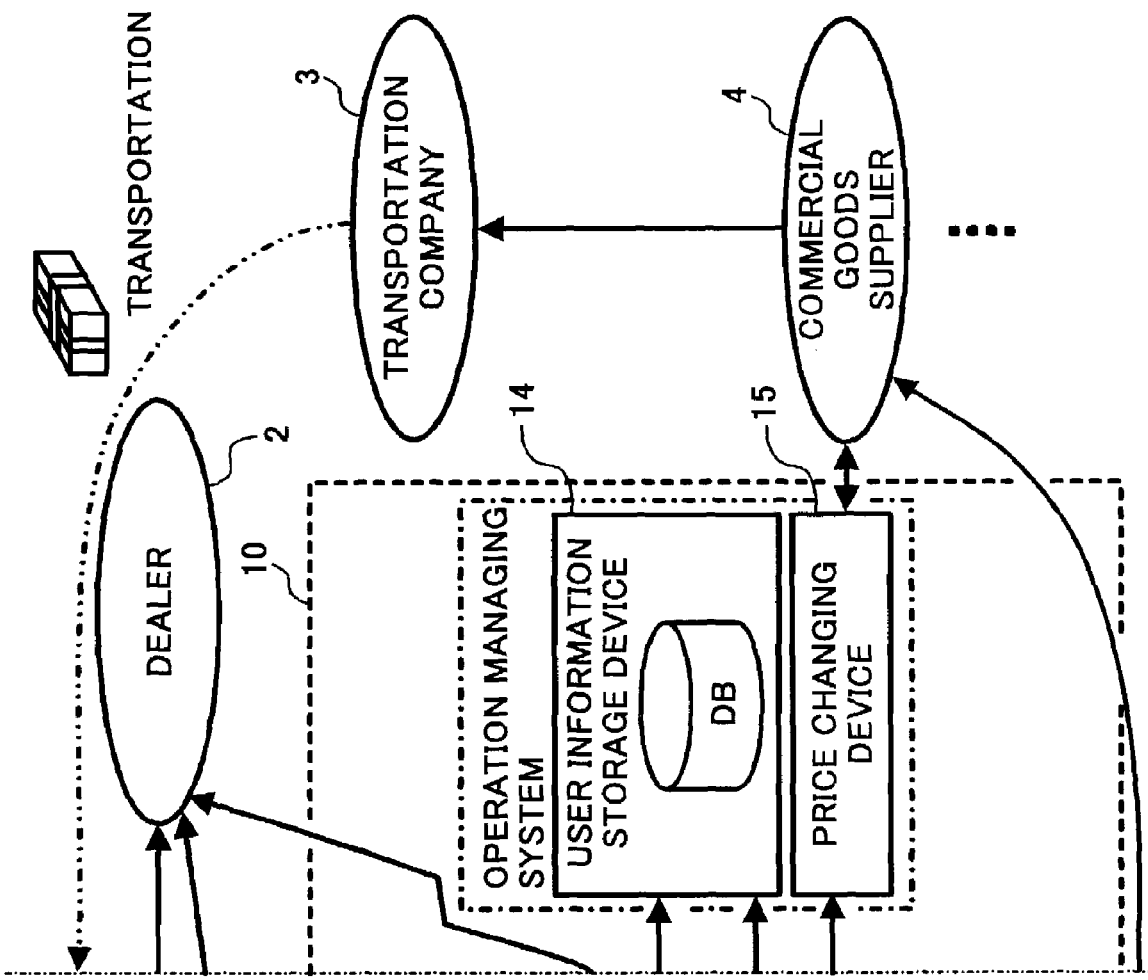
Figure 19:
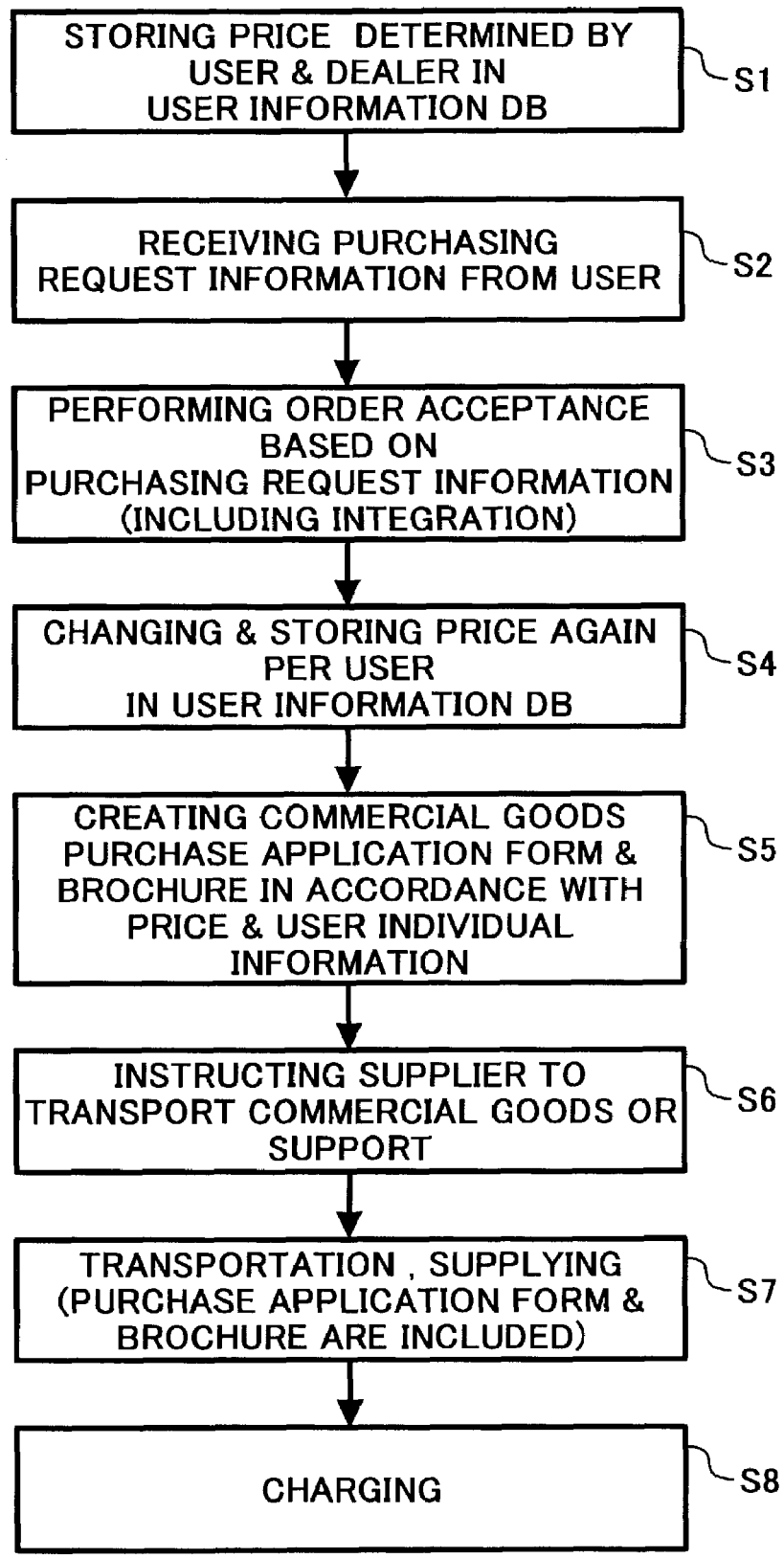
FIG. 19 is a flowchart illustrating an example of a method of accepting and transporting a commodity order executed in the system of FIG. 18.

FIGS. 18A and 18B are charts collectively illustrating an example of an embodiment of a commodity order acceptance and transportation system as one example according of the present invention. FIG. 19 is a flowchart illustrating an example of a commodity order acceptance and transportation method of the system of FIG. 1. The commodity order acceptance and transportation system 10 (hereinafter referred to as a present system) is a system that allows an administrator (e.g. a manufacturer) to sell and provide a commodity and support service to a user 1 via any one of facsimile, telephone, and electronic mail. The commodity order acceptance and transportation system 10 is capable of setting and clearly specifying sales prices of the commodity and support service per a user to the user as a feature. The present system is a system of the invention disclosed in Japanese Patent Application No. 2000-374376 filed by this applicant and is capable of providing a commodity and support service, while setting and clearly specifying a sales price to a user 1.

A system that causes a commodity provider 4 to provide a commodity, i.e., that handles only another company's commodity and support service and not own is initially described in the present embodiment. However, it is practical that each company's commodities and support services are handled as mentioned later. The present system is configured to include a reception device 11, an invoicing device 12, an order acceptance device 13, a commodity transportation instruction device 16, a commodity transportation instruction device 16, a brochure creating device 17, a brochure providing device 18, a user information storage device 14, and a purchase information storage device 15. For the sake of simplicity, respective devices 11, 12, 13, 16, 17 and 18 are described as devices included in an order acceptance system. Respective devices 14 and 15 are described as devices included in an operation administration system.

Further, each of devices except for the reception device 11 and a portion of a later described brochure providing device (e.g. a mailing device in a case when a brochure is mailed) may be operated by a computer.

In such a situation, a program operating the computer may be stored in a server device and executed. The server device and various databases stored in a later described storage device may employ conformations such that the databases are either physically included in the server device or separated and connected thereto via a network. Further, each of the databases may be separated or integrated. In short, every type of configuration is allowable if functions of these databases may be exerted. A configuration of the server device may be a computer including a server function having a hierarchical structure, such as a server for network connection use (e.g. a web server when a later described Internet connection is needed), an authentication server for authenticating each user, a database administration server for administrating various databases, etc. A computer is sufficient for storing a program executing functions of later described respective devices. This program preferably includes a graphical user interface so as to enable a user to readily use the respective devices. Further, a transportation instruction to a provider 4 is preferably transmitted to a client apparatus of the provider 4 via the network. Also, processing of a dealer 2 is preferably executed from a client of the dealer 2 via the network (not shown). Further, the network may be formed from the Internet connected by a wired or wireless private line (including a line of an optical fiber) or telephone line. The network may be formed from Intranet or Extranet using the Internet. Further, the private use line may be configured by a WAN (Wide Area Network) or MAN (Metropolitan area Network).

In the operation managing system, the user information storage device 14 stores sales prices of a commodity and/or support service, determined by a user 1 and dealer 2, together with individual information related to the user (in step S1). The sales price to be stored in the user information storage device 14 may be only of a highly frequently purchased commodity or highly frequently requested support service set per a user. A sales price determined from various parameters, such as a membership/non-membership, a purchase frequency, etc., is preferably stored in the user information database (DB) that stores these parameters and user information.

When storing, the dealer 4, for example, preferably uses a client apparatus and accesses the server device of the present system and stores them in the user information DB via an order acceptance processing device 13. The purchase information storage device 15 stores purchase prices of a commodity and/or support service from the supplier 4 of the commodity and support service (in step S2). Prices of commodities and support services and other costs are necessarily stored in a purchase DB that stores information of respective commodities and support services. However, details thereof are not described.

Purchase request information transmitted by any one of a facsimile, telephone, and electronic mail is received by a reception device 11 (in step S2) of the order acceptance system. The purchase request information is configured to include user information, such as a name, a membership number (in a case of a membership registration system), etc., capable of identifying a user 1, commodity ordering information, and/or support service requesting information. The support service represents various services, such as various settings of an ordering commodity and other existing commodities, replacement and transportation of consumable items, etc. To perform reception at this stage, a purchase requesting form, in which formal items are filled, is transmitted by facsimile, telephone, or electronic mail while referring to a later described brochure.

Subsequently, in the order acceptance processing device 13, the purchase request information received by the reception device 11 is consolidated, and order acceptance processing is performed in accordance with the purchase request information received from the user 1 (in step S3). The sales price stored in the user information storage device 14 is changed and stored again by the payment amount changing device 15 per a user (in step S4).

The sales price changing device 15 may discount and store respective sales prices for the commodities and support services in accordance with the frequency of requests for commodities and support services. Further, the sales price changing device 15 may discount and store partial or the entire sales prices of commodities and support services by a prescribed percentage in accordance with the frequency of requests for the commodities and support services. In this example, a prescribed percentage discount is applied in accordance with a number of sales of commodities and support services of the partial or entire payment amounts, i.e., the entire purchase amounts or that within a prescribed time period by a user.

When executing such a discounting scheme, an initial sales price and a rate of a change in the sales price (a change rate in accordance with a frequency of requests) may be set. The brochure creating device 17 creates a purchase request form together with a brochure of a commodity in accordance with a sales price (i.e., a sales price changed and stored again by the sales price changing device 15) stored in the user information storage device 14. The frequency for creating brochures is preferably freely set.

Subsequently, a commodity transportation instruction device 16 instructs an appropriate provider 4 to transport and provide a commodity and/or support service included in the purchase request information in accordance with the order acceptance processing performed by the order acceptance device 13 (in step S6) by referring to various information stored in the user information storage device 14. The instruction represents that the administrator purchases a commodity or support service from the provider 4. Subsequently, the provider 4 executes transportation of a commodity and provision of support service to a user in accordance with the instruction (in step S7). The brochure providing device 18 provides a user with respective of the purchase request form and brochure created by the brochure creating device 17. As a providing method, they may be obtained when a user inputs a user ID on a home page through the Internet. Otherwise, they may be recorded in a recording medium such as a CD-ROM or duplicated and mailed. Further, duplication of the record may also be mailed.

Such transportation and provision are arranged by a transportation company 3 serving as a delivery company or an own company (i.e., provider 4). When support service request information is included in the purchase request information, the delivery company is instructed to execute the support service included therein at the time of delivery of the commodity. An invoicing device 12 invoices expenses of a commodity and/or support service included in the purchase request information to the user 1 and/or dealer 2 in accordance with a sales price of the commodity and personal information of the user 1 stored in the user information storage device 14 (in step S7). It is preferably invoiced to one of the user 1 and dealer 2 by making out a bill (before confirming delivery), confirming the delivery and its result. Further, such invoicing may be performed before the step S6. The invoicing to the user 1 is as to expense for the commodity and support service and includes a charge for service of the dealer 2 to be paid thereto.

Invoicing to the dealer 2 is for an amount obtained by subtracting a charge for service of the dealer 2 from expenses for a commodity and support service. Invoicing to a user 1 may be built into the order acceptance system to be automatically performed by it. However, due to commodity trading based upon an agreement signed up between a user 1 and dealer 2, either the above-described manner is employed, or the above-described system preferably automatically makes and transmits a bill for a user 1 to the dealer 2, so that the dealer 2 may invoice the bill to the user 1 as it is or after processing of it.

The above-described support service request information preferably includes information related to a request for collection of a recycle commodity, such as a used toner cartridge, a used toner container, a used paper, etc. Further, a used paper private use box is preferably provided to the user, and the used paper is preferably collected, when it is full with the used paper and support service request information indicating used paper collection is generated by a user.

Further, the support service request information may be intended to include various information, such as designation of a place for delivery, i.e., to deliver at a place that a user designates, an unpacking delivery instruction to unpack when a commodity is delivered, an empty carton collection instruction to collect an empty carton unnecessary for a user, commodity replacing delivery instructions to perform first-in first-out, delivery date designation to designate a delivery date of an ordered commodity, an urgent transportation instructions to request for urgent transportation, fixed quantity periodical transportation instructions to periodically transport a designated commodity so as to stock a determined quantity thereof, etc. It is preferable that the delivery company is instructed to perform user support service in accordance with such information. No problem essentially occurs in processing the present system, if a processing order, except for steps S3, S4 (except for consolidation), S5, and S6, is changed for an already registered user, for example.

No problem essentially occurs in processing the present system, if a processing order, except for steps S2, S3 (except for consolidation), S6, and S7, is changed for an already registered user, for example. Further, FIGS. 18A and 18B illustrates by premising that the sales price changing device 15 executes a changing process after an order reception process is executed by an instruction from the order reception processing device 13. However, a changing process for changing a purchase price may be executed when user purchase information included in the user information DB is changed. Further, a sales price of an order accepted commodity and support service may be set to decrease after an order acceptance process (e.g. after a prescribed number of times or time period of the order acceptance processes).

According to the present system, the sale price changing device may change the sale price of a commodity and the user may be notified of the change via a brochure. Further, due to availability of various purchasing manners such as facsimile, telephone, electronic mail, etc, a user may purchase a commodity and support service by its preferable purchasing manner.

Figure 20B:
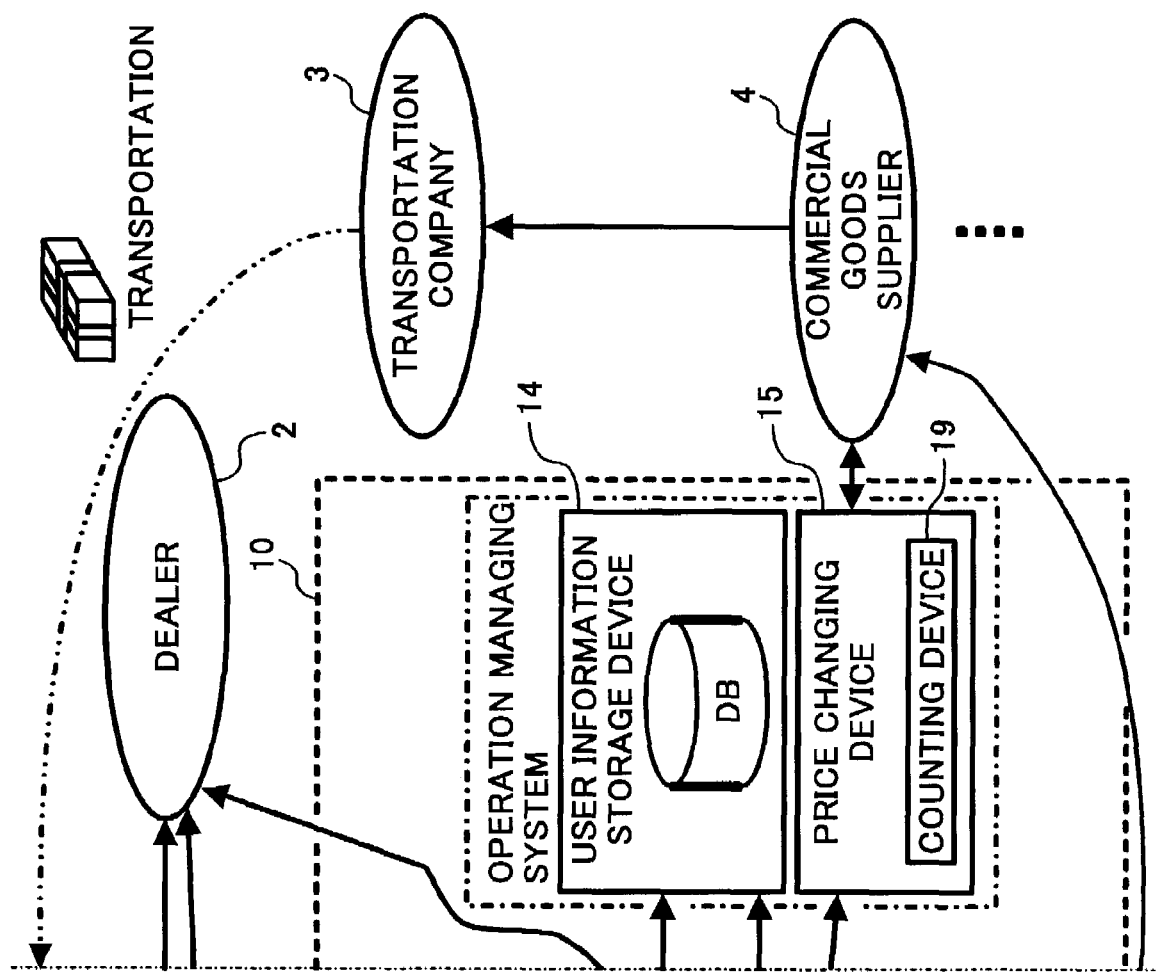
Figure 21:
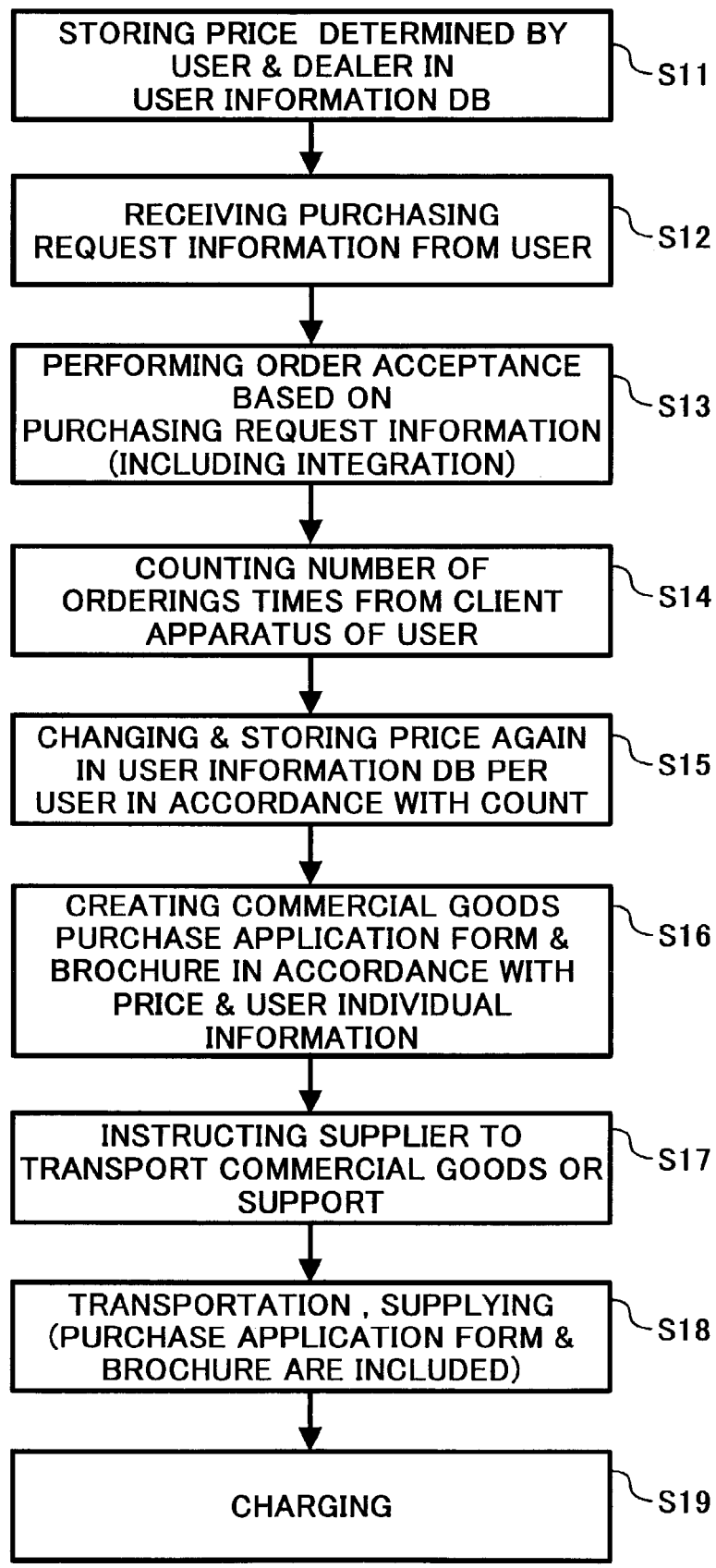
FIG. 21 is a flowchart illustrating an example of a method of accepting and transporting a commodity order-executed in the system of FIG. 20.

FIGS. 20A and 20B are charts collectively illustrating an example of a configuration of a commodity order acceptance and transportation system of another embodiment according to the present invention. FIG. 21 is a flowchart illustrating an example of a method of the commodity order acceptance and transportation system of FIGS. 20A and 20B. A commodity order acceptance and transportation system 10 (herein after referred to as a present system) of still another embodiment of the present invention includes a counting device 19 for counting a number of events serving as a reference for changing a sales price in the sales price changing device 15 included in the above described systems with reference to FIGS. 18A to 19.

The events are the number of orders for each sales price (commodity and support service) from a user. The counting device 19 counts the number of orders from a user per a commodity and support service, or regardless thereof. Then, the sales price is changed and stored again in the user information DB in accordance with the number counted by the counting device 19 (in step S15). The count of the counting device 19 may be weighted in accordance with a sales price of a commodity and support service. Steps S11 to S113 of FIG. 21 are similar to those S1 to S3 of FIG. 19. Also, steps S16 to S19 of FIG. 21 are similar to those S5 to S8 of FIG. 19. Thus, these similar steps are omitted to describe.

Figure 22B:
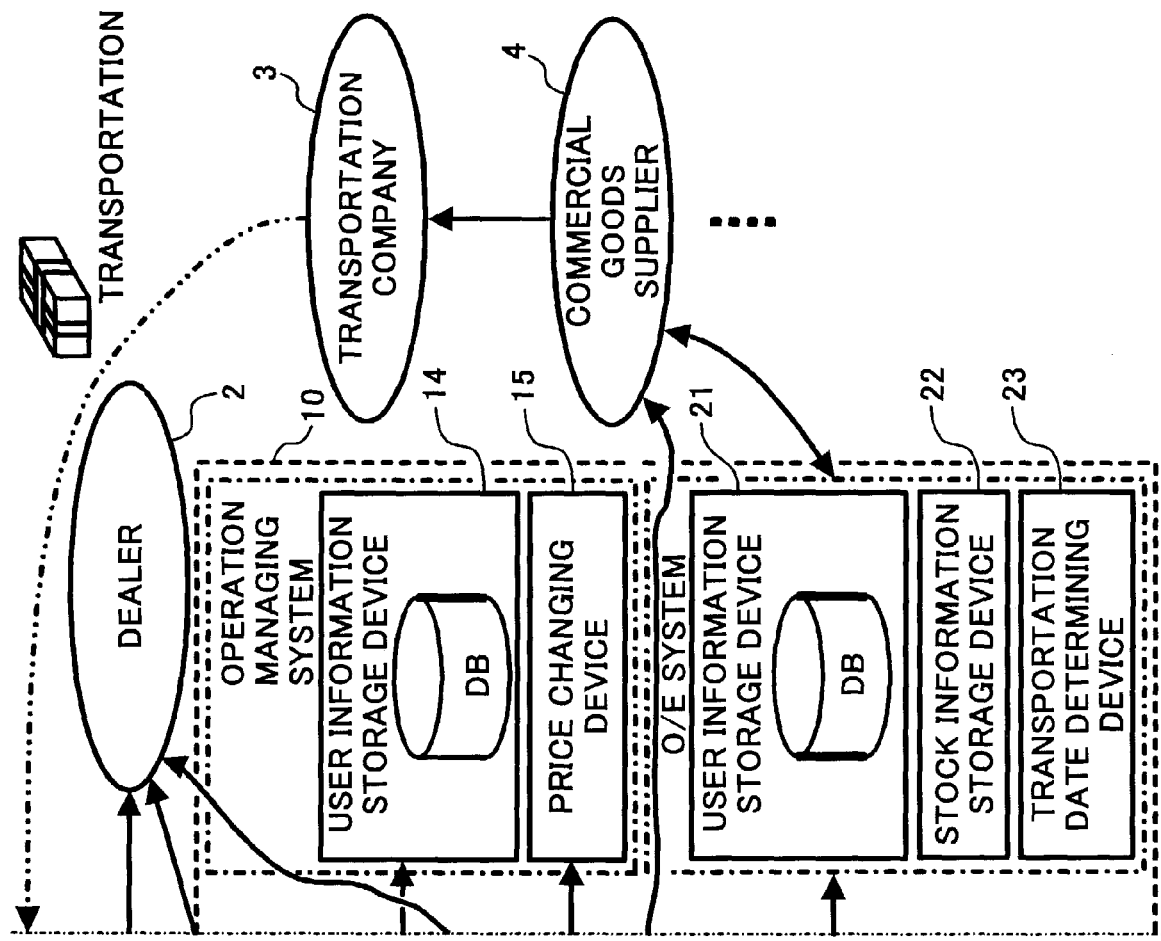
Figure 23A:
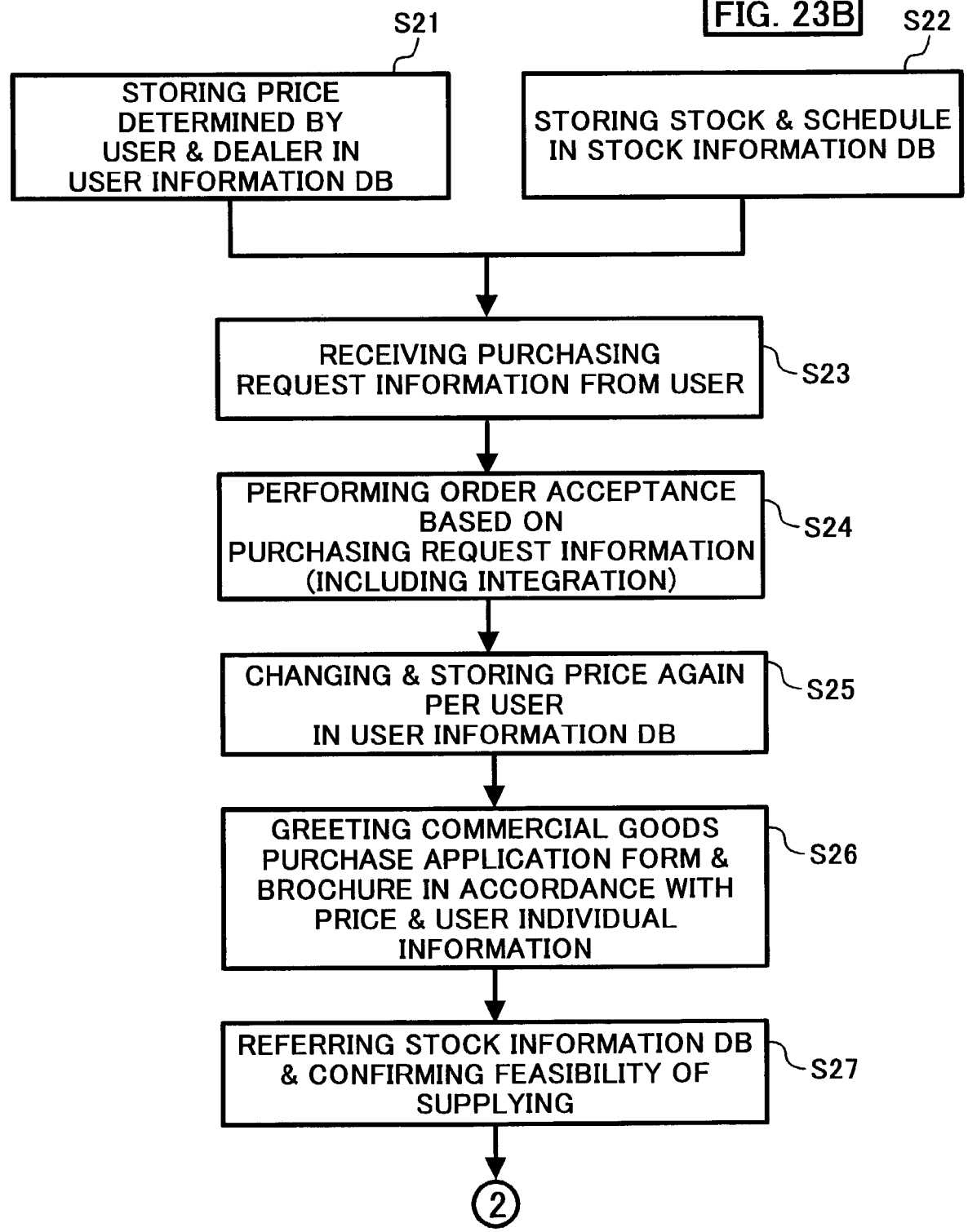
FIGS. 23A and 23B are flowcharts collectively illustrating an example of a method of accepting and transporting a commodity order executed in the system of FIG. 22.
Figure 23B:
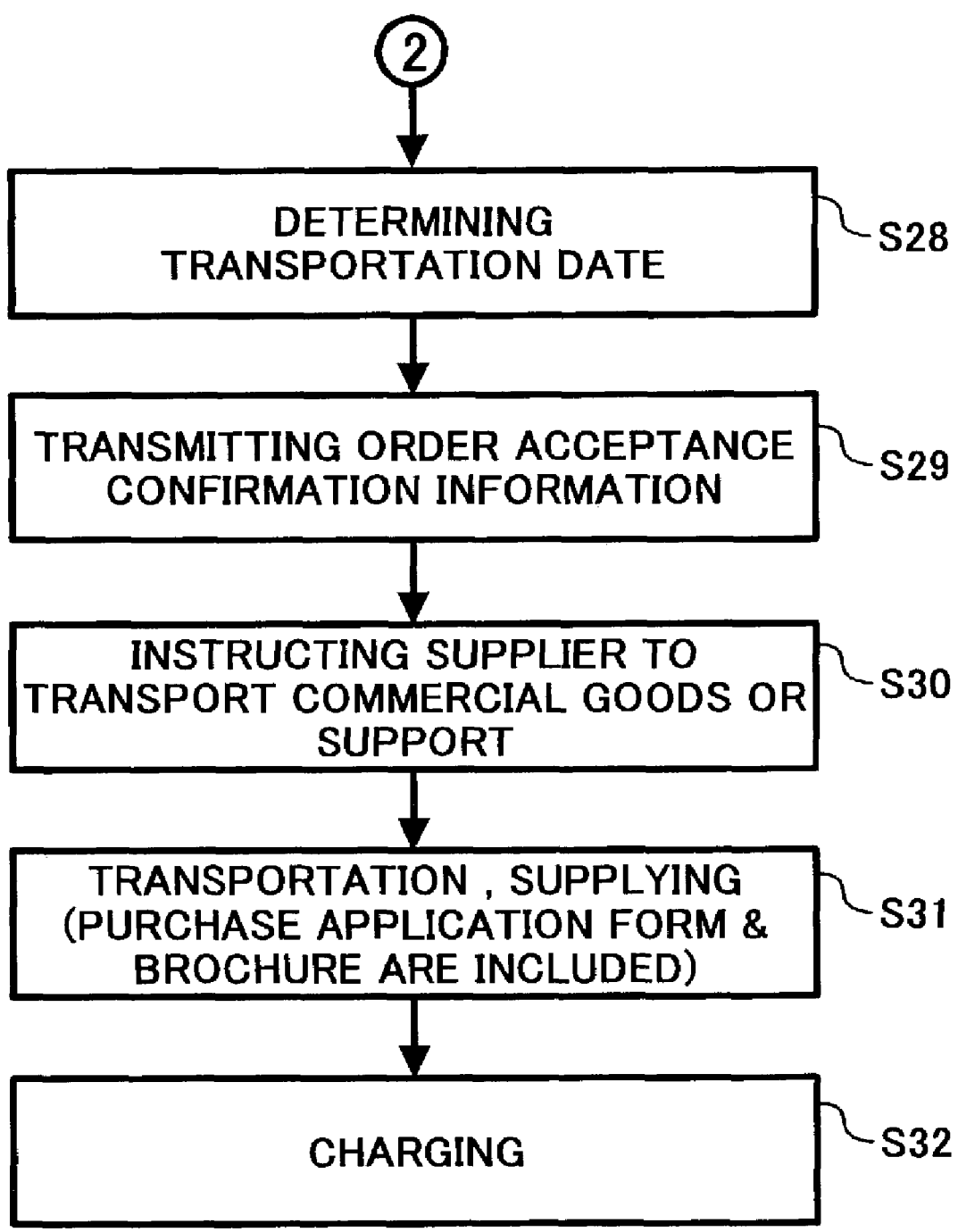

FIGS. 22A and 22B are charts collectively illustrating an example of a configuration of a commodity order acceptance and transportation system of still another embodiment of the present invention. FIGS. 23A and 23B are flow charts collectively illustrating an example of a method for order accepting and transporting of a commodity in the system of FIG. 22. A commodity order acceptance and transportation system 10 (hereinafter referred to as a present system) of the still another embodiment is a system capable of also providing a commodity and support service from an own company (administrator) in the above-described embodiments. Specifically, one of the providers 4 is configured as a trader 4' administrating the present system 10. The present system further includes an inventory information storage device 21, inventory confirmation device 22, transportation date determining device 23, and order acceptance confirmation information transmitting device 24. For the sake of convenience, the order acceptance confirmation information transmitting device 24 is described as a device included in the order acceptance system. Each of devices 21, 22 and 23 is described as a device included in an order entry system (O/E system). Further, steps S21, S23, S24, S25, S26, S30, S31 and S32 of FIG. 23 are similar to those S1, S2, S3, S4, S5, S6, S7 and S8 of FIG. 19. Thus, similar description is omitted.

In the O/E system, the inventory information storage device 21 stores commodity inventory information and/or schedule information related to support service personnel (in step S22). Inventory information and schedule information are preferably stored in the inventory information DB. The inventory confirmation device 22 confirms if commodity and/or support service ordered may be provided based upon the information (included in the inventory information DB) stored in the inventory information storage device 21 (in step S27). This confirmation process is preferably executed after or before an order acceptance process in step S35. The transportation date determining device 23 determines a transportation date of a commodity included in the purchase request information in accordance with inventory confirmation result obtained by the inventory confirmation device 22 and the purchase request information (in step S27).

The order acceptance confirmation information transmitting device 24 automatically transmits the transportation date determined by the transportation date determining device 23 together with the purchase request information as an order acceptance confirmation to a user by a facsimile or electronic mail (in step S28). The commodity transportation instruction device 16 provides an instruction to transport a commodity on the transportation date determined by the transportation date determining device 23 (in step S30).

Figure 24B:
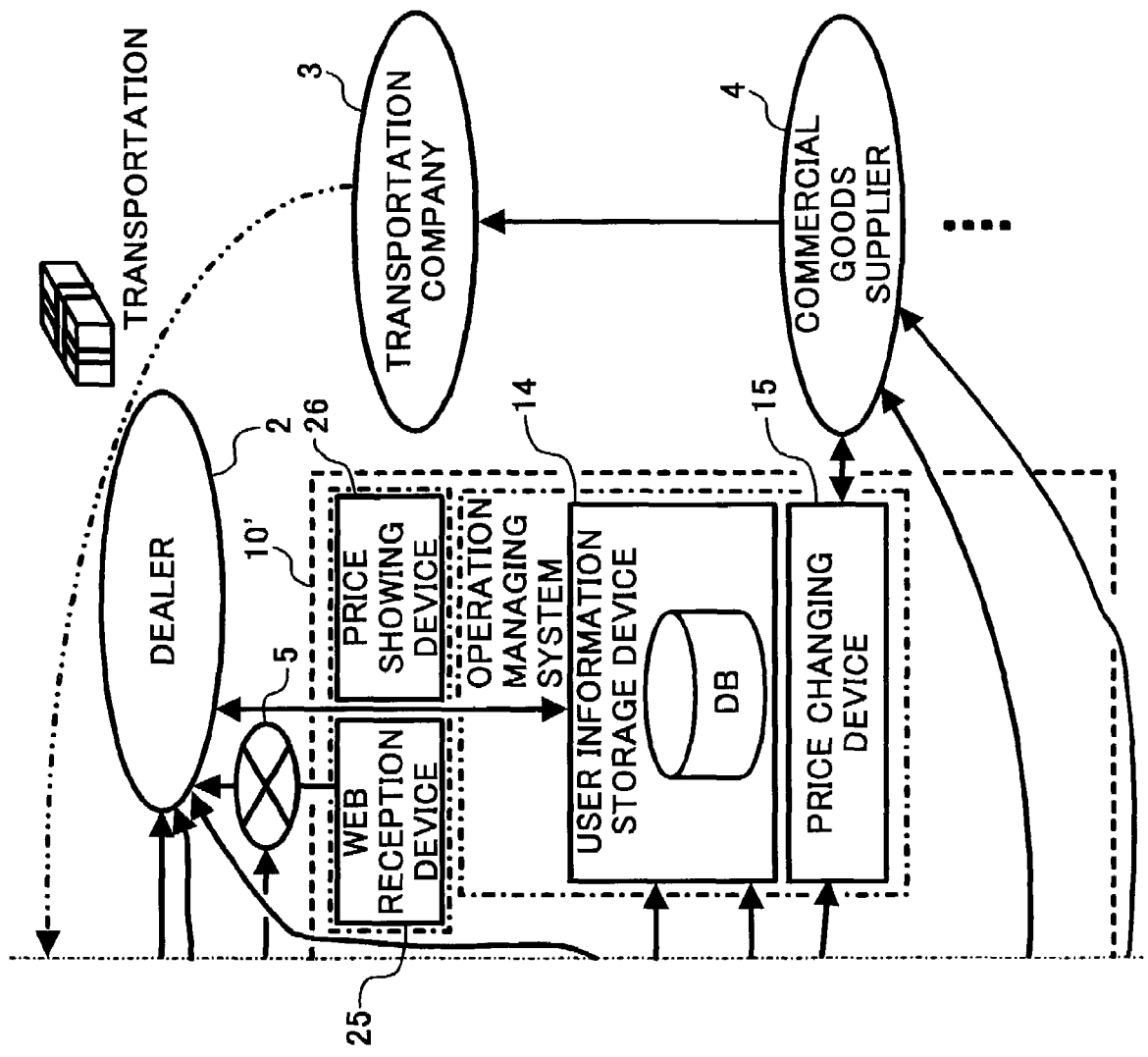
Figure 25:
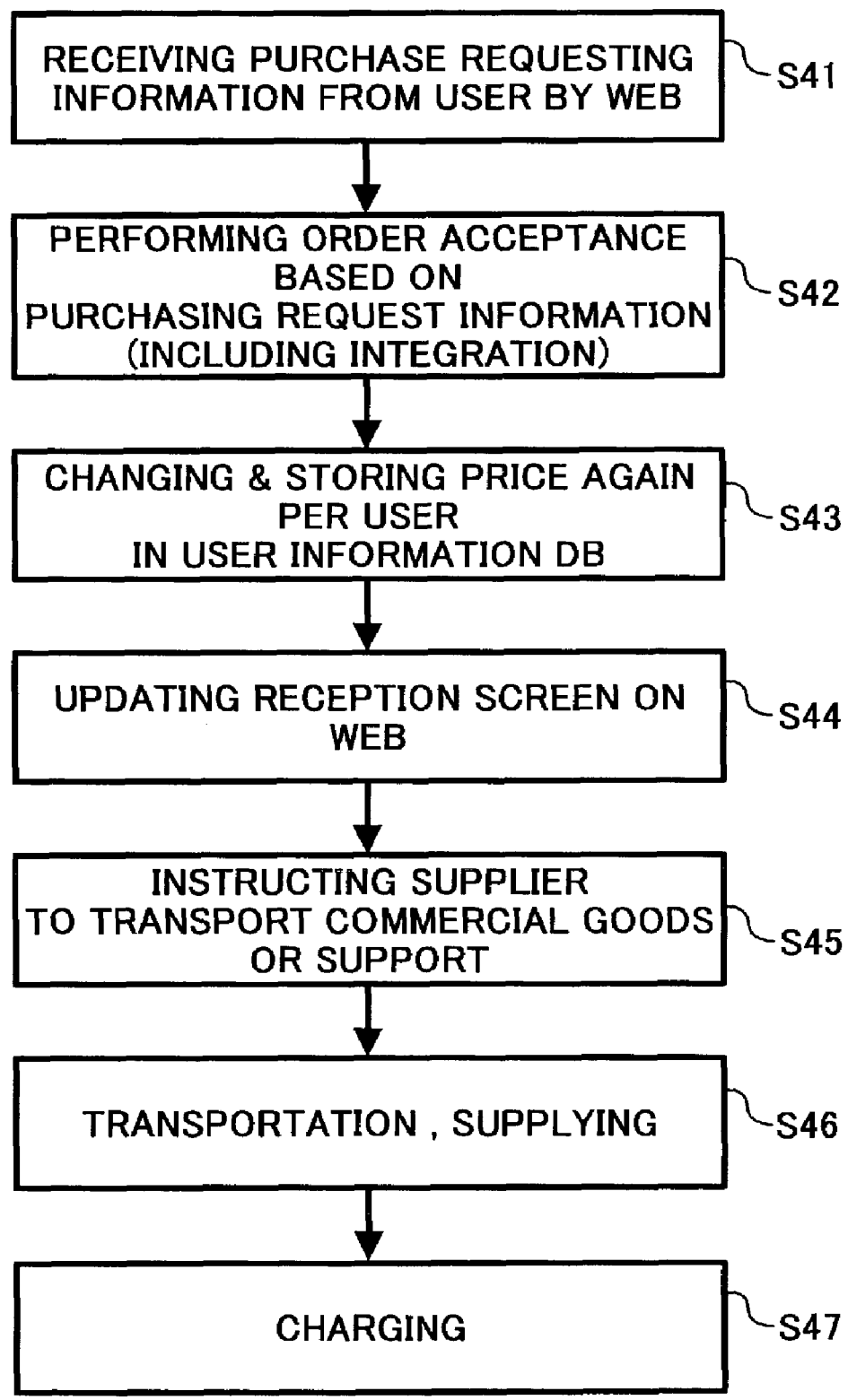
FIG. 25 is a flowchart illustrating an example of a method of accepting and transporting a commodity order executed in the system of FIG. 24.

FIGS. 24A and 24B are charts collectively illustrating an example of a configuration of commodity order acceptance and transportation system of still another embodiment of the present invention. FIG. 25 is a flowchart illustrating an example of a method for order accepting and transporting a commodity in the system of FIGS. 24A and 24B. Still another embodiment of the commodity order acceptance and transportation system 10' (hereinafter referred to as a present system) is a system that enables purchases of a commodity and support service using the web via the Internet in the above-described embodiments. Namely, the present system 10' includes a web reception device (a network reception device) 25 that receives user information and purchase request information having commodity order acceptance information and/or support service request information, which are transmitted from a user 1 (a client apparatus such as PC of the user) to a web server via the Internet. Differences from the above-described various embodiments are as follows:

First, the order acceptance processing device 13 consolidates purchase request information received by the reception device 11 and web reception device 25. The user information storage device 14 stores sales prices determined by a user and dealer 2 for commodities and support service which are received by the reception device 11 together with personal information of the user. In addition, the user information storage device 14 stores sales prices determined by a user and dealer 2 for commodity and support service which are received by the web reception device 25 together with personal information of the user. Further, the invoicing device 12 preferably previously settles invoices received by the web reception device 25 on the network. This embodiment exemplifies a system integrating and processing both receptions by the reception and Web reception devices 11 and 25. However, a system for only receiving via the Web reception device 25 may be employed. A reception process by the Web reception device 25 receives purchase request information from a user via the Web (in step S41). Various purchase request information received by the web reception device 25 are consolidated and are subjected to an order acceptance process by the order acceptance processing device 13 in accordance with the purchase request information (in step S42).

A sale price stored in the user information storage device 14 is changed and stored again by the sales price changing device 15 per a user 1 (in step S43). Then, a reception screen provided per a user on the Web is updated by the sales price presenting device 26 so as to be enabled to present to a user (in step S44). Details of the reception screen are described later with reference to FIGS. 26A and 26B. The commodity transportation instruction device 16 instructs a provider to transport a commodity or provide a support service included in the purchase request information (in step S45) in accordance with an order acceptance process performed by the order acceptance processing device 13 by referring to storage information stored in the user information storage device 14.

In accordance with the instruction, transportation of the commodity and provision of the support service are executed (in step S46). In this situation, when there exists a reception by the reception device 11, a brochure or the like is occasionally transported. Invoicing of step S47 is similarly performed to that of step S8 of FIG. 2.

FIGS. 26A and 26B are charts collectively illustrating an example of a sales price presenting device included in the system of FIGS. 24A and 24B, and showing a display example of a commodity support service quick order site in the Web. The sales price presenting device 26 presents a purchase request form including sales price information to applicable user in accordance with a sales price and personal information each stored in the user information DB. In FIGS. 26A and 26B, numeral number 30 denotes a screen of a private use site for the user 1. As illustrated in a user name display section 31, a private use screen for Mr. Ricoh in exemplified. Subsequent to a screen of a home page as a default, the screen 30 is reached via a user ID (and password) input screen or the like. In the user name display section 31, the delivery destination display section displays the user name, the address display section 33 displays the address and telephone number therefor, and respective default values are displayed with reference to the user information DB.

In this example, for a delivery destination, a default value is displayed, and a pull-down menu is provided to enable the selection of another delivery destination. Thus, an address of a selected delivery destination is displayed on the address display section 33.

Further, as to a presenting manner of a sales price as a feature of the present invention, a purchase request form 35 clearly indicating a private use commodity and support service name 36 for Mr. Ricoh, it's code number 37, sales price 38, and number of request quantity 39 are indicated. Order acceptance is performed when Mr. Ricoh inputs a purchase number in commodity columns 39 for a purchase commodity and support service and clicks an order button. In addition, when the order is difficult to be executed on the Internet due to an expensive commodity being ordered, and being unclear of a standard or the like of a commodity only from description of the home page, it is enabled to click a button and request a sales person to visit.

The mechanisms and processes set forth in the present invention may be implemented using one or more conventional general purpose microprocessors and/or signal processors programmed according to the teachings in the present specification as will be appreciated by those skilled in the relevant arts. Appropriate software coding may readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed is:

1. An order acceptance and invoicing system comprising:
    a reception device configured to receive purchase request information from a user via a prescribed communication system other than Internet, the purchase request information including at least one of product ordering information and service requesting information in addition to user information of the user;
    a Web reception device configured to receive purchase request information transmitted from a user via the Internet, said purchase request information including at least one of product ordering information and service request information in addition to user information of a user;
    an order acceptance processing device configured to receive and consolidate the respective purchase request information transmitted from the reception device and the Web reception device;
    a first storage device configured to store a purchase price of at least one of a product and a service to be purchased by the system from a provider external to the system in accordance with the purchase request information, said first storage device being accessed by a client of the provider through a prescribed communication system to confirm the purchase price;
    a second storage device configured to store a sales price of at least one of a product and a service to be sold by a dealer external to the system to a user in association with personal information of the user, the sales prices being determined by the user and the dealer before ordering including a commission for the dealer beside the purchase price, said second storage device being accessed by a client of the dealer through a prescribed communication system to register a sales price;
    a product transportation instructing device configured to instruct the provider via a prescribed communication system to transport a product or provide a service included in the purchase request information to a user; and
    an invoicing device configured to invoice payment for at least one of the product and the service included in the purchase request information to the dealer;
    wherein said order acceptance processing device transmits the purchase request information and instructs the product transportation instructing device to operate, and transmits information obtained from the first and second storage devices and instructs the invoicing device to operate; and
    wherein said invoicing device calculates the payment of the dealer by subtracting the commission from the sales price stored in the second storage device.

2. An order acceptance and transportation system comprising:
    a Web reception device configured to receive purchase request information from a user, said purchase request information including at least one of product ordering information, and service request information in addition to user information of the user, the purchase request information being transmissible from the user to a Web server via Internet,
    an order acceptance processing device configured to receive the purchase request information from the Web reception device,
    a storage device configured to store a sale price of at least one of a product and a service to be sold by a dealer external to the system to a user in association with personal information of the user, said sales price being determined by the user and the dealer including a commission for the dealer beside a purchase price of the at least one of the product and the service to be purchased from a provider external to the system, said storage device being accessed by a client of the dealer to register a sale price through a prescribed communication system in accordance with the determination;
    a sales price changing device configured to change a previous sales price in accordance with a past record of transaction with the user and store a new sales price in the sales price storage device per a user;
    a sales price presenting device configured to present the new sales price to a user via a prescribed communication system in advance of the next order from the user;
    a product transportation instructing device configured to instruct the provider to transport a product or provide a service included in the purchase request information to a user; and
    an invoicing device configured to invoice payments for at least one of the product and the service included in the purchase request information to the dealer,
    wherein said order acceptance processing device transmits the purchase request information and instructs the product transportation instructing device to operate, and transits information obtained from the storage device and instructs the invoicing device to operate; and
    wherein said invoicing device calculates the payment of the dealer by subtracting the commission for the dealer from the sales price stored in storage device.

3. An order acceptance and invoicing system comprising:
    a reception device configured to receive purchase request information from a user, said purchase request information including at least one of purchase request information and service requesting information in addition to user information of the user, the product ordering information being transmissible via a prescribed communication system other than Internet;
    a Web reception device configured to receive purchase request information from a user, the purchase request information including at least one of product ordering information and service request information in addition to user information of the user, the purchase request information being transmissible from the user to a Web server via the Internet,
    an order acceptance processing device configured to receive and combine the purchase request information transmitted from the reception device and the Web reception device;
    a sale price storage device configured to store a sales price for at least one of a product and a service to be sold by a dealer external to the system to a user in association with personal information of the user, said sales price being determined by the user and the dealer before ordering including a commission for the dealer beside a purchase price of a product and service to be purchased from a provider external to the system, said sale price storage device being accessed by a client of the dealer to register a sale price in accordance with the determination through a prescribed communication system;

a sales price changing device configured to change a previous sales price in accordance with a past record of transaction with a user and store a new sales price in the sale price storage device per a user;

a sales price presenting device configured to present the new sales price stored in the sales price storage device to a user via a prescribed communication system in advance of the next order from the user;

a form creating device configured to create a purchase requesting form indicating a sales price and personal information stored in the second storage device, said purchase requesting form specifying purchase requesting information;

a form providing device configured to provide the purchase requesting form to a user in advance of the next order from the user, a product transportation instructing device configured to instruct a provider to one of transport a product and provide a service included in the purchase request information; and an invoicing device configured to invoice payment for at least one of the product and the service included in the purchase request information to the dealer, wherein said order acceptance processing device transmits the purchase request information and instructs the product transportation instructing device to operate, and transmits information obtained from the sales price storage device, and instructs the invoicing device to operate; and wherein said invoicing device calculates the payment to the dealer by subtracting the commission for the dealer from the sales price stored in the sales price storage device.

4. The system of claim 1, wherein the sales price of at least one of the product and the service received by the reception device are substantially the same to those received by the Web reception device.

5. The system of claim 2, wherein the sales price changing device discounts and stores the sales price of at least one of the product and the service in accordance with a frequency of orders of at least one of the product and the service.

6. The system of claim 2, wherein the sales price changing device discounts the sales price of at least one of the product and the service at a prescribed rate in accordance with a frequency of orders of at least one of the product and the service.

7. The system of claim 2, further comprising:

a second storage device configured to store inventory information related to at least one of product and schedule of a service person, an inventory confirmation device configured to confirm if at least one of an ordered product and a service is available in accordance with the inventory information, a transportation date determining device configured to determine a transportation date when a product included in the purchase request information is transported in accordance with a result of confirmation of inventory and an order acceptance acknowledge transmitting device configured to automatically transmit the transportation date to a user as order acceptance acknowledge using a prescribed communication system;

wherein the product transportation instructing device instructs the provider to transport the product on the date.

8. The system of claim 1, further comprising a purchase price changing device configured to change the purchase price of the at least one of the product and the service in accordance with one of a total number of products and a frequency of services already ordered, wherein said purchase price changing device decreases the purchase price when the total number or the frequency exceeds a prescribed level.

* * * * *